(12) United States Patent
Wagstaff et al.

(10) Patent No.: US 6,629,095 B1
(45) Date of Patent: Sep. 30, 2003

(54) SYSTEM AND METHOD FOR INTEGRATING DATA MINING INTO A RELATIONAL DATABASE MANAGEMENT SYSTEM

(75) Inventors: William M. Wagstaff, Saratoga, CA (US); Donovan A. Schneider, San Francisco, CA (US); Ann M. Koehler, San Jose, CA (US); Craig J. Bunger, San Francisco, CA (US); Richard L. Cole, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/170,990

(22) Filed: Oct. 13, 1998

Related U.S. Application Data

(60) Provisional application No. 60/063,999, filed on Oct. 14, 1997.

(51) Int. Cl.[7] .................................. G06F 17/00
(52) U.S. Cl. .................. 707/5; 707/3; 707/4; 707/6; 706/45
(58) Field of Search ............... 706/12, 18, 6, 706/16, 45; 705/10; 707/1–10, 100–104, 200–206; 711/100

(56) References Cited

U.S. PATENT DOCUMENTS

| | | | | |
|---|---|---|---|---|
| 5,970,482 A | * | 10/1999 | Pham et al. ................. | 706/45 |
| 5,991,751 A | * | 11/1999 | Rivette et al. .............. | 707/102 |
| 6,185,549 B1 | * | 2/2001 | Rastogi et al. ............... | 706/45 |
| 6,185,559 B1 | * | 2/2001 | Brin et al. ..................... | 707/5 |
| 6,185,561 B1 | * | 2/2001 | Balaban et al. ............... | 707/6 |
| 6,439,783 B1 | * | 8/2002 | Antoshenkov ................ | 707/1 |
| 6,516,308 B1 | * | 2/2003 | Cohen .......................... | 706/12 |
| 6,516,310 B2 | * | 2/2003 | Paulley ......................... | 707/2 |

OTHER PUBLICATIONS

Hsu et al., "Analyzing the subjective interestingness of association rules", IEEE Intelligent Systems, vol. 15, Issue 5, Sep.Oct. 2000, pp. 47–55.*

Seltzer et al., "INDED: a distributed knowledge–based learning system", IEEE Intelligent Systems, vol. 15, Sep.–Oct. 2000, pp. 38–46.*

Kusiak et al., "Autonomous decision–making: a data mining approach", Information Technology in Biomedicine: IEEE Transactions on, vol. 4, Issue 4, pp. 274–284, Dec. 2000.*

Brobowski et al., "Oracle 7 Server Concepts Manual", pp. 5–3, 11–3, Dec. 1992.*

Hirayama et al., Scalable data mining with log based consistency DSM for high performance distributed computing, Engineering of Complex Computer Systems, 2000, ICECCS 2000, Proceedings Sixth IEEE Conference on, 2000, pp. 143–150.*

Robinson et al., Data mining information visualization—beyond charts and graphs, Information Visualisation, 2002, Proceedings, Sixth International Conference on, 2002, 577–583.*

Hou, A framework for statistical data mining with summary tables, Scientific and Statistical Database Management, 1999, Eleventh International Conference on, Aug. 1999, pp. 14–23.*

* cited by examiner

*Primary Examiner*—David Jung
(74) *Attorney, Agent, or Firm*—Janaki K. Davda; Konrad, Raynes, Victor & Mann LLP

(57) ABSTRACT

An integrated data mining and relational database management system is provided on a server. The data mining engine determines characteristics of relationships between input data values and an output data value that are obtained from a relational database (managed by the relational database management system). The integration allows direct conversion of data values from the relational database to data mining identifiers used for data mining operations by the data mining engine, and vice-versa. The integrated server also makes patterns uncovered during data mining (e.g., "understand" and "predict" information) available in virtual relational database tables that can be queried.

42 Claims, 14 Drawing Sheets

Relationship Stream

<$DMID_{IN}$, $DMID_{OUT}$>  <Relationship Information>;

<$DMID_{IN}$, $DMID_{OUT}$>  <Relationship Information> . . .

FIG. 5B

SYSTEM AND METHOD FOR INTEGRATING DATA MINING INTO A RELATIONAL DATABASE MANAGEMENT SYSTEM

CROSS-REFERENCE TO RELATED APPLICATIONS

This application claims priority under 35 USC 119(e) from U.S. Provisional Application No. 60/063,999, filed Oct. 14, 1997, naming Wagstaff et al. as inventors, and titled "SYSTEM AND METHOD FOR INTEGRATING DATA MINING INTO A RELATIONAL DATABASE MANAGEMENT SYSTEM." That application is incorporated herein by reference in its entirety and for all purposes.

BACKGROUND OF THE INVENTION

The present invention relates to relational database management systems. More specifically, the invention relates to data mining applications for data stored in a relational database table.

Data mining is the process of discovering unexpected patterns or trends in existing data so that a database user can use the discovered knowledge to manage a business more effectively. For example, a typical application might study the demographic information known about a list of customers to create a profile of people most likely to buy a given product, respond to a direct mail campaign, or default on a loan.

Despite its name, "data mining" has little to do with "drill-down" queries; these types of queries are feasible in a data warehouse that has no data mining component. The difference between a data mining exercise and standard decision support queries lies in the analyst's approach to the data: standard queries are assumption-driven, whereas data mining is discovery-based.

For example, an analyst who writes a query that compares sales last year to sales this year is looking for an accurate result to a routine business question, while an analyst who mines sales data is looking for patterns or trends that might be interesting and useful to understand. If the sales comparison query reveals that sales this year are up 200% from last year in some stores but only 100% in others, for example, the analyst might want to mine the data to discover any unexpected reasons for this discrepancy.

In other words, the data warehouse application helps analysts understand what happened, while data mining applications attempt to tell analysts why it happened. It is useful for a retailer to know, for example, what factor had the greatest impact on sales of a given product, and whether the retailer can control that factor or take advantage of that knowledge. Any number of factors can influence sales—price, style, packaging, promotions, placement in the store, season, weather, day of week, time of day, and so on. Without requiring analysts to ask explicit questions about each possible factor, a data mining application can read very large volumes of data and discover both obvious and hidden trends.

A data mining exercise consists of two main phases: building a model and predicting future results. A model defines the influencing factors (input data) is and the potential outcomes (output values). If the data must be obtained from a large pool of data that already exists (e.g., a relational database), the model also defines how these factors and outcomes are selected and mapped from the larger pool of data. The set of inputs, which might be very large (100 or more), is a list of factors that might influence the output. The result of the data mining exercise is a much smaller list of inputs that individually or in combination with other inputs does influence the output.

In turn, the model provides the ability to predict an output given a set of input characteristics. For example, if the model accurately reflects the tendency of customers with certain attributes (age, gender, income, and so on) to purchase a luxury automobile, the discovered results can be compared with a list of prospective buyers to determine those most likely to make a purchase in the near future. Because models can be used independently or in conjunction with query analysis, a warehouse query might be issued to generate a promotional mailing list from a Customer table.

Categorization analysis (a subset of data mining) has useful applications in various industries—financial services, direct mail marketing, telecommunications, insurance, healthcare, retail sales—as a means of solving business problems by leveraging a deeper knowledge of the targeted consumers. Some of these applications are as follows:

Promotion analysis—In retail sales, understanding which products customers often purchase in combination with other products can lead to changes and improvements to in-store displays, seasonal promotions, advertising campaigns, and general advertising strategies.

Churn analysis—In telecommunications, discovering the profile of individuals likely to switch (or not to switch) long-distance carriers helps find ways to attract long-term customers and discourage short-term customers from switching carriers.

Claims analysis—In insurance, isolating the characteristics of a good risk can save both time and money. In healthcare, cost-cutting measures can be discovered by analyzing the history of a claim and the profile of the claimant.

Customer profiling—In almost any business, discovering the demographic profile of consumers most likely to buy or use a given product is critical to maintaining a competitive edge. The ability to compile effective target mailing lists is a common result of good profiling.

Rate and usage analysis—In telecommunications, studying the details of customer calls helps analysts find ways to better serve customers and keep their business, as well as improve the day-to-day service available to those customers.

Fraud detection—In insurance, healthcare, and credit-card businesses, discovering the typical characteristics of a fraudulent claim or application helps analysts predict and prevent future fraudulent activity.

Various data mining products are available including "DataCruncher" from DataMind Corporation of San Mateo, Calif., "IBM Intelligent Miner" from IBM Corporation of Armonk, N.Y., and "MineSet" available from Silicon Graphics, Inc., of Redwood City, Calif. To use large data sets, all of these products must first retrieve data from a relational database (via SQL) and then convert the retrieved data to a flat file, and finally send that file to the data mining engine. Unfortunately, even if the data mining functionality can quickly and efficiently handle the large data sets it receives, the associated systems can convert and send the data only relatively slowly. First, the step of converting the database data to a flat file entails significant effort, including converting data types. Second, transporting the data to the data mining functionality typically involves sending the file over an ODBC connection. Unfortunately, transporting the large data sets necessary for many data mining projects over such connections is too slow for many applications. A related problem exists in providing the mined results back into a database. Specifically, other tools need to transfer the mined results back into the database, further increasing the overhead.

Further, some data mining products employ spreadsheets to provide the data used in the data mining operation and to display results of the operation. Without a mechanism for rapidly porting large data sets (from a large database for example), the size of the data sets employed with such products are limited. In addition to limiting application of data mining to relatively small data sets, this can limit the validity of models generated from the data.

In view of these limitations, a data mining system with improved performance would be desirable.

SUMMARY OF THE INVENTION

The present invention fills this need by providing an integrated data mining and relational database system. This is accomplished by eliminating the need to convert data to a flat file and export it from the relational database management system to a data mining engine. In addition, the invention makes patterns uncovered during data mining (e.g., "understand" and "predict" information) available in virtual relational database tables that can be queried.

Preferably, the relational database management system integrated with the data mining engine is integrated on a server. The data mining engine determines characteristics of relationships between input data values and an output data value that are obtained from a relational database (managed by the relational database management system). The integration allows direct conversion of data values from the relational database to data mining identifiers used for data mining operations by the data mining engine. It also allows identifiers output by the data mining engine to be converted back to the data values. As mentioned, prior data mining systems did not integrate data mining engines with relational database management systems. Therefore, they had to first convert data from the relational table to a flat file or other format before transferring that data to the data mining engine, which then converted the raw data to data mining identifiers for the process of data mining.

The integrated data mining engine and the relational database system of this invention allows users to create a data mining model that includes a model table specifying input columns and an output column for rows of values from the relational database. Note that the rows specify the relationships between the input values and the output value. Preferably, the model table includes a definition for the model but is not populated with data values. However, the model itself may include one or more data model look up indexes specifying translations between values in the relational database and data mining identifiers used by the data mining engine to represent the relational database values. One look up index may be a forward translation index configured to translate data values from the relational database to data mining identifiers. Another look up index may be a reverse translation index configured to translate data mining identifiers to corresponding data values from the relational database. The indexes allow data to be inserted for calculations by the data mining and rows to be constructed in response to user queries.

Another aspect of the invention relates to data mining models including a definition for a relational table providing multiple relationships between input values and output values and indicia of the "importance" of each relationship between an output and one or more inputs. Such relational tables are sometimes referred to as UNDERSTAND sub-tables. The importance of the relationship may be determined by the data mining model to be any one or more criteria indicating how strong the tie between the input values and the output value might be. Often the importance indicates the strength of the correlation between the input values and the output value.

Preferably, the relational table is not actually populated with data, but is tied to a data mining model so that the computer system can construct rows corresponding to the relationships in response to user queries. These rows can be displayed as views or otherwise presented to the user for review.

While the relational table may not be populated with data values, it does include a definition that may specify one or more columns for user specified outputs and inputs from a relational database. The rows of the table may specify relationships between input data values and an output data value. The definition may also specify one or more columns that indicate the importance of the relationships. For example, one column might be defined to contain values indicating occurrence counts for the relationships, another to contain occurrence frequencies for the relationships, and another to specify correlations for the relationships. Preferably, the importance of the relationships (however it is represented) is calculated by a data mining engine.

Yet another aspect of the invention provides a data mining model including a definition for a relational "PREDICT" table providing multiple relationships between input values and output values and configured to return a predicted output value in response to a query containing one or more input values. Preferably, the relational predict table is further configured to return a "confidence" value for the predicted output value it returns in response to the query. The confidence in the prediction may take various forms. For example, it may take the form of a discrimination value calculated by a data mining engine. The discrimination indicates the relative likelihood of one output occurring over another output in response to the same set of inputs.

The PREDICT relational table preferable exists only as a definition, unpopulated by actual data values. In response to user queries requesting a prediction, the computer system constructs rows corresponding to the relationships that include a column for an output and one or more columns for user specified inputs from a relational database. The rows will also include a column for confidence in the predicted output (indicated as a discrimination value for example).

Another aspect of the invention provides a method of evaluating a query on a predict table in a data mining model. The method may be characterized as follows: (a) identifying an expression or sub-expression in a predicate of the query; (b) identify a start/stop condition from the expression or sub-expression; (c) binding the start/stop condition to a column of the predict table; and (d) passing column values constrained by the start/stop condition to a data mining engine. The method may require that expression meet certain criteria before its start/stop conditions will be bound to the column. If the expression or sub-expression does not meet these criteria, the DBMS may defer application of start/stop conditions (or even evaluation of start/stop conditions) until after receiving results of a data mining operation from the data mining engine. An example of a condition used to determine whether a start/stop condition should be applied before or after data mining is the condition that the expression or sub-expression be atomic and conjunctive. Further, the expression or sub-expression may have to compare a bindable value to a model input.

These and other features and advantages of the present invention will be detailed below with reference to associated drawings.

BRIEF DESCRIPTION OF THE DRAWINGS

FIG. 5B is a diagram of a relationship stream from a data mining engine and used by a database system to present information from an UNDERSTAND sub-table.

DETAILED DESCRIPTION OF THE PREFERRED EMBODIMENTS

Figure 1A:
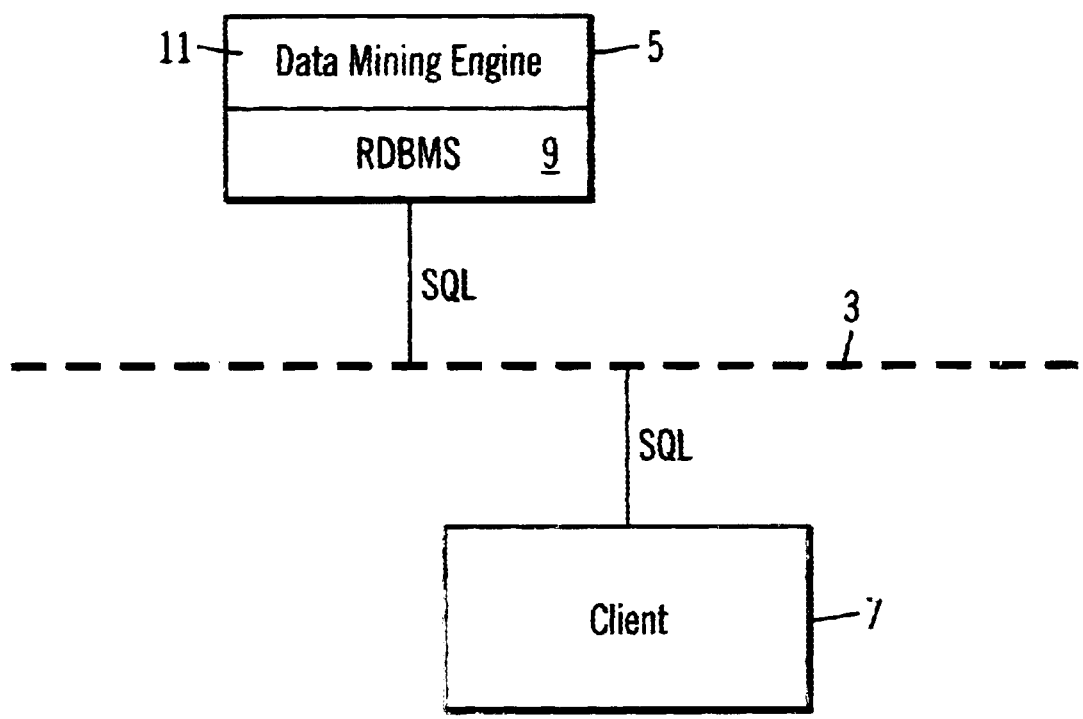
FIG. 1A is a block diagram illustrating a preferred architecture of this invention in which an integrated database (or warehouse) and data mine conducts rapid data mining operations in connection with a front-end tool.

The present invention makes use of a data mining engine that calculates one or more values representing the importance of relationships chosen by a data mining user. The relationships represent a connection between an output value (e.g., whether or not popcorn was sold) and one or more input values (e.g., types of candy sold and types of drink sold). The data defining individual instances of these relationships may be obtained from a relational database. For example, one relationship used by the data mining engine might be that for customer A, a sale of chocolate (candy) and lemonade (drink) did not result in a popcorn sale. For customer B, a sale of a soda (drink) but no candy resulted in popcorn sale. For a customer C, a sale chocolate with a soda resulted in a popcorn sale. And for a customer D, a sale of licorice and no soda resulted in no popcorn sale.

In this example, the data mining user is interested in factors affecting the sale of popcorn. Do some products go with popcorn more naturally than others do? Obviously, more profound and complex data mining investigations can be performed. For now, just recognize that a large group of relationship instances of a standard form (e.g., input CANDY, input DRINK, output POPCORN SALE (yes or no)) are examined by the data mining engine to determine the importance of each of them or of groups of them. The "importance" may take the form of a correlation between specific inputs and a specific output, the discrimination between the two different relationships having the same inputs (but different outputs), the occurrence rate of a particular relationship instance (a gauge of the statistical validity of the result), etc.

This invention assumes that the data mining engine properly performs its role of analyzing the relationships and outputting the importance of the various relationships. It is not concerned with the calculations that make up the data mining operation. The invention is directed to ways in which the data mining engine and a relational database system (e.g., a RDBMS) are integrated. Preferably, they are tightly integrated such that the data mining engine can perform its calculations without transferring large blocks of data from a remote database. Preferably, the integration also allows the relationships provided by the user and the information calculated by the data mining engine to be analyzed in relational tables. By using an RDBMS, the entire process of building a data mining model and using it for understanding and prediction may be done with a standard (or slightly extended) set of SQL commands.

Some suitable data mining engines work on compact data mining identifiers that represent values comprising the relationship instances. For example, "chocolate" may be represented by the identifier "56." The reason for using identifiers is that the data mining engine can manipulate small identifiers much easier than it can the corresponding text strings, floating point values, images, etc. that are stored in a database. An example of a suitable data mining engine for use with this invention is the "DataCruncher" from DataMind Corporation.

FIG. 1A represents a client server architecture that may be used with the database systems of this invention. As shown, a network 3 includes a server 5 that services requests from a network client 7. Server 5 includes a relational database management system 9 (e.g., a Data Warehouse such the Red Brick Warehouse available from Red Brick Systems, Inc. of Los Gatos, Calif.) integrated with a data mining engine 11. Preferably, RDBMS 9 and data mining engine 11 are so tightly integrated that they appear as single server to client 7—which communicates directly with the RDBMS. The result of this integration is one product—a data warehouse RDBMS with data mining capabilities as well as ad hoc query analysis functions. Preferably, all capabilities and functions of server 5 are accessible via SQL, using a conventional SQL-based front-end tool running on client 7, for example.

Generally, the servers and/or the clients of this invention may be specially constructed for the required purposes, or, more typically, may be a general purpose programmable machine selectively activated or reconfigured by a computer program stored in memory. The processes presented herein are not inherently related to any particular computer or other computing apparatus. In one specific example, server 5 (including RDBMS 9 and data mining engine 11) runs on a single machine such as a computer running a UNIX or Microsoft Windows NT operating system. In a specific example, client 7 runs on a PC or workstation.

Because the information (tables, indexes, and certain other data structures) and program instructions may be employed to implement the data mining systems/methods described herein, the present invention relates to machine readable media that include program instructions, tables, indexes, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 1B:
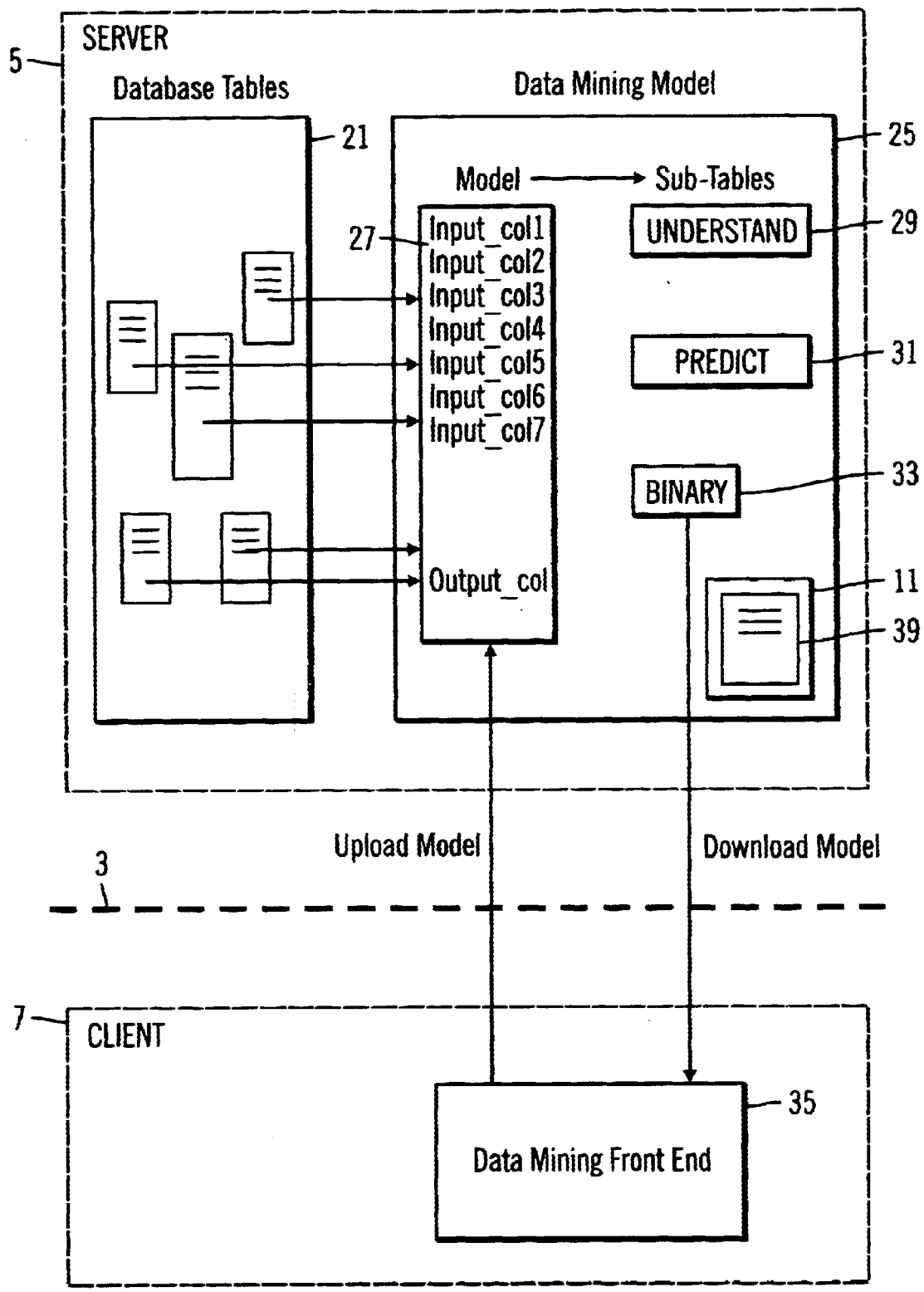
FIG. 1B is a block diagram of a warehouse server of this invention including an integrated relational database and data mining model/engine.

Data mining in the relational database engine is accomplished by building models that behave like tables. FIG. 1B shows how a relational database serves as the data source for a data mining model, which consists of the parent "table" and three child "sub-tables."

As shown in FIG. 1B, network 3, server 5, client 7, and data mining engine 11 exist in the configuration shown in FIG. 1A. However, server 5 is shown in more detail. RDBMS server 5 includes a collection of tables 21 that together provide the data necessary to populate a data mining model 25. Data from tables 21 is represented in a "model" 27 within the umbrella data mining model 25. Model 27 lists the user-defined output and various inputs defining the relationship instances for data mining. Preferably, the model does contain data, but only unique data. For example, in the popcorn example, no matter how many users buy "soft drinks," only one instance of the value "soft drink" exists in the model and it is associated with a data mining identifier. Data mining engine 11 keeps a count of the occurrences of the "soft drink" value in the data set. As a user refines his or her model, inputs and outputs may be inserted into or deleted from model 27. In a specific example, the inputs and outputs correspond to columns from tables 21.

The descriptions of the sub-tables are created automatically when the model is created. Specifically, the system creates an UNDERSTAND sub-table 29, a PREDICT sub-table 31, and, optionally, a BINARY sub-table 33. The data mining discovery process is performed on the server whenever data is inserted into the model; users can query the UNDERSTAND and PREDICT sub-tables to study the results of that process.

UNDERSTAND sub-table 29 presents patters patterns uncovered by data mining engine 11 during the discovery process. In a specific embodiment, it may rate patterns it discovers in terms of "importance" (strength of the relationship or correlation), occurrence count, occurrence frequency, discrimination, etc.

PREDICT sub-table 31 may be queried to discover the most likely output for a given set of input values. Thus, users can use the results of the data mining discovery process as a predictive tool or model to forecast events. Typically, the user's query will include a list of inputs and the PREDICT output will be a likely outcome based on those inputs. A particularly important value calculated by data mining engine 11 for use with PREDICT sub-table 31 is a discrimination value which indicates the relatively likelihood that one outcome will prevail over another.

BINARY sub-table 33 contains a binary file readable by a front-end data mining client application 35 (including a graphical user interface) resident on client 7. This sub-table allows models created on a data mining client running application 35 to be "uploaded" to the server 5, while models created on server 5 in SQL can be "downloaded" to client 7. Preferably application 35 provides a graphical user interface (GUI) on a PC and connects to the database via an ODBC interface. One example of a suitable client application is the Red Brick Data Mine Builder application; for details on its operation refer to the Red Brick Data Mine Builder User's Guide available from Red Brick Systems, Inc. of Los Gatos, Calif.

Still further, data mining model 25 communicates with data mining engine 11, which includes an internal model data object 39 containing the identifiers used by the data mining engine during the discovery process. In essence, internal model data object 39 represents the relationships specified in model 27 via data mining identifiers that the data mining engine can manipulate during discovery. It keeps count of the occurrences of each value (identifier) in the data set. It also recognizes the input and output columns defined for the model, but it is populated with identifiers rather than data values of the database. Data object 39 provides a link between the data mining model 25 (part of the RDBMS) and data mining engine 11.

The integrated data mining RDBMS systems of this invention may be used in an iterative process:
1. Create a model.
2. Populate the model to perform discovery.
3. Query the UNDERSTAND sub-table to see the results of the discovery process.
4. Refine the model as required.
5. Use the model for prediction.

The first four steps represent a complete phase in the process that might be called the model-building phase. These steps are likely to be performed by an application developer—someone very familiar with the RDBMS and SQL. The fifth step represents a second phase that is more likely to be of interest to business analysts. Predictive models may be typically shared and reused among various decision-making groups connected to the same data warehouse.

Figure 2:
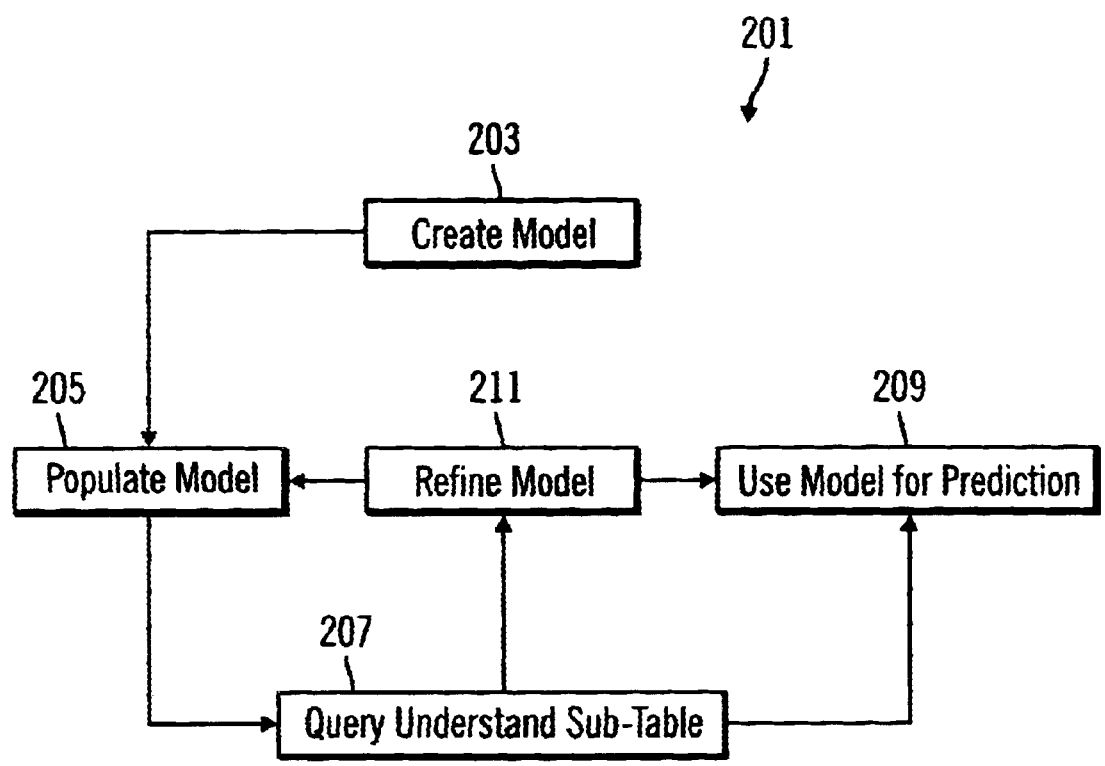
FIG. 2 is a flow diagram illustrating an iterative technique for creating and using and refining a data mining model.

FIG. 2 illustrates the iterative nature of a data mining process 201. Initially, an application developer creates a model at a step 203. This may involve defining the inputs, outputs, and other relevant model parameters in a CREATE MODEL statement. The RDBMS then creates definitions for the model table 27 and the UNDERSTAND, PREDICT, and BINARY sub-tables 29, 31, and 33. Other possible steps associated with this process will be detailed below with reference to FIGS. 3A–3D.

Next, at a step 205, the developer instructs the RDBMS to insert data into the model (via an INSERT command for example). This "populates" the model with data and initiates execution of the data mining engine. In the process, the data mining engine provides information about patterns in the user-defined relationships and it makes this information available to the UNDERSTAND, PREDICT, and BINARY sub-tables 29, 31, and 33. Each new insert may update the model (but only if it contains values not already in the model). The sub-tables share data stored in the model.

Next, at a step 207, a user queries UNDERSTAND sub-table 29 to find out what patterns were uncovered during the data mining discovery operation (initiated by the user's INSERT command). The UNDERSTAND sub-table may indicate that relevant patterns were uncovered. These patterns could be used for forecasting and other predictions. If the user sees no further reason to refine the model, he or she may use the model to predict outcomes of other inputs in a prediction step 209. Alternatively, the user may decide, on reflection of the UNDERSTAND table query, that the model could use refinement. If so, he or she refines the model at a step 211. This may involve modification of the CREATE MODEL statement prepared at step 203 and then a subsequent model population step initiated by an INSERT command as in step 205. The refined model then may be repopulated (step 205) and checked with a query of the UNDERSTAND sub-table per step 207. After one or more refinements, the user may find that the model is suitable for prediction, and the process moves to step 209. For more details about each step in this process, refer to the RED BRICK DATA MINE USER'S GUIDE (from Red Brick Systems, Inc.) which is incorporated herein by reference in its entirety and for all purposes.

A preferred embodiment will be described below in which a data mining engine is closely integrated with a relational database management system through a series of data mining specific SQL statements and through a collection of indexes which translates values from a relational database to simpler "identifiers" used by a data mining engine. It should be understood that this invention is not limited to this particular collection of SQL statements or indexes. In fact, the invention is not necessarily limited to use with data mining engines that employ simple identifiers of the type described below ("data mining identifiers" or DMIDs). For the sake of illustration, the invention will be described with respect to a data mining engine resembling the "DataCruncher" made available by DataMind Corporation.

Figure 3A:
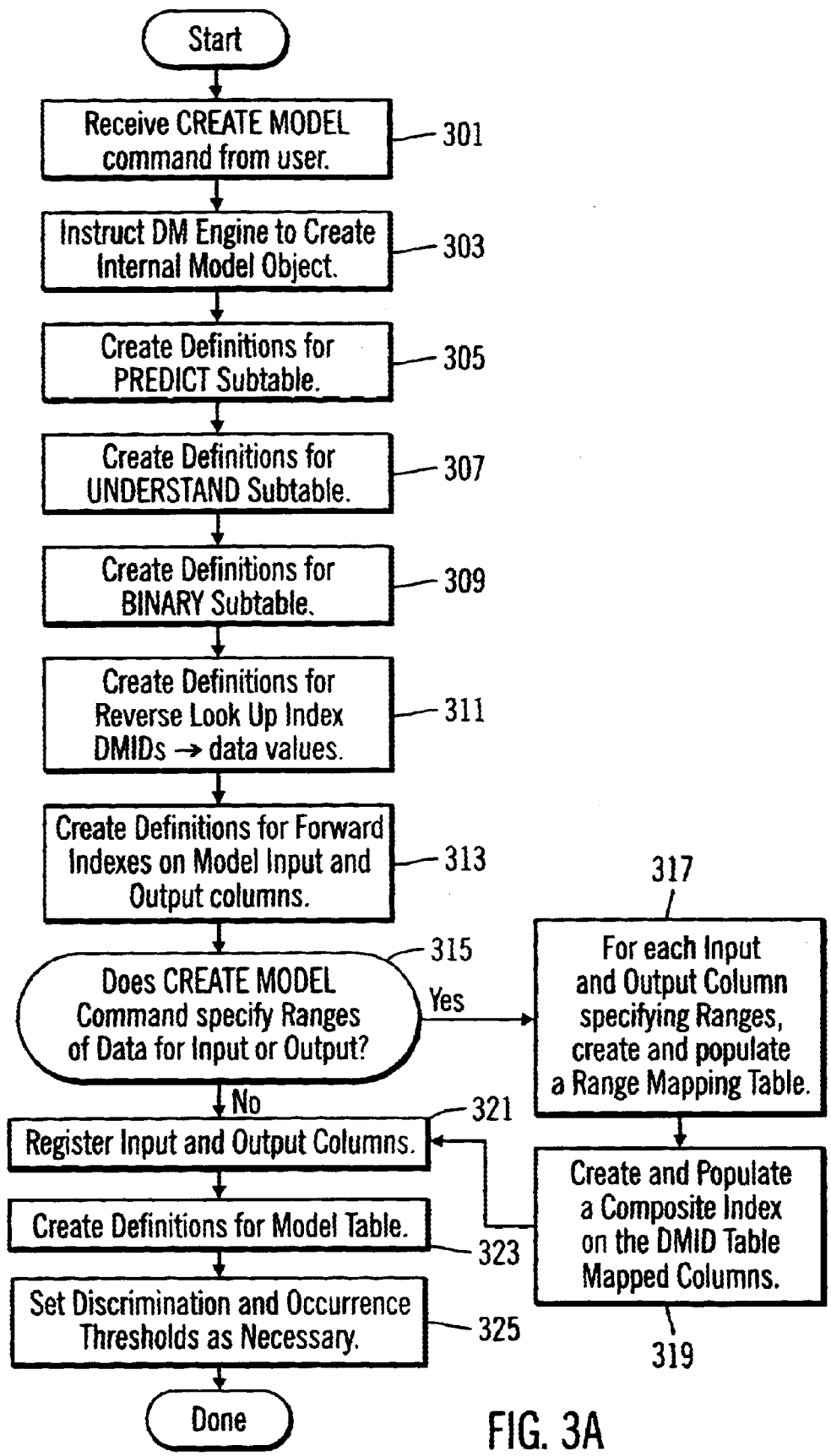
FIG. 3A is a process flow diagram depicting a procedure used by a database system to create a data mining model in accordance with one embodiment of this invention.

Referring now to FIG. 3A, a process for creating a model in accordance with one embodiment of this invention is depicted. This process corresponds to step 203 of FIG. 2. Initially, the system (e.g., server 5) receives a CREATE MODEL command from the user. As explained herein, a CREATE MODEL command may completely define the model including its input columns, output column, any bucket ranges, any discrimination threshold, and any occurrence threshold. From the above simple example, a CREATE MODEL command may be the following:

create model popcorn (candy char (20) input, drinks char (20) input, popcorn char (3) output);

The purpose of this model is to discover what combinations of candy and drink purchases at a chain of movie theaters tend to be accompanied by a purchase of popcorn (an example of categorization analysis). The Popcorn column contains the values "Yes" and "No," while the other two columns contain generic names of types of candy and drinks (for example, "Chocolate" and "Soda"). Although only two inputs are used here, any number of input columns could be added to the model, and multiple versions of the model could be created to "rotate" the columns. For example, a second model could have the Popcorn and Drinks columns as inputs and the Candy column as the output. Such "product grouping" analyses are common in the retail industry. The goal of these analyses is to discover what products tend to be bought or consumed together, then find ways to promote or facilitate the sales of those products.

After the system receives the CREATE MODEL command at step 301, it instructs the data mining engine to create internal model data object 39 (FIG. 1B) at a step 303. This may involve passing the name of the model to the data mining engine to allow it to allocate space and internally make any necessary arrangements. It may also involve registering input and output columns with the data mining engine without specific reference to type or name or other descriptive information.

The CREATE MODEL command also triggers the creation of the model sub-tables. Thus, at a step 305, the system creates definitions for a relational PREDICT sub-table of the model. Note that the PREDICT sub-table is not yet populated with data. The population step will have to await a subsequent process of populating the model (via queries from a user, for example). At this point, the system merely provides a name for the PREDICT sub-table as well as input columns and associated data types, an output column and an associated data type as specified by the CREATE MODEL command received at step 301. It may also define PREDICT sub-table columns for the Rank, Validity, Discrimination Score, etc. of the relationships defined by the inputs and output.

Next, at a step 307, the system creates definitions for a relational UNDERSTAND table. As with creation of the PREDICT sub-table, creation of the UNDERSTAND sub-table does not involve populating that table. Rather, it simply sets up the definitions including the table name, input columns and data types, output column and a data type, a column for the importance of each relationship, a column for the occurrence frequency of each relationship, etc.

Next, at a step 309, the system creates the definitions for a BINARY sub-table. Again, this sub-table is not yet populated with values. The appropriate definitions including a user-defined name of the BINARY sub-table is provided at this step. This sub-table includes a BINARY file that is readable by a separate application (see application 35 FIG. 1A) that provides a convenient interface for creating a model, transferring the model from the server to the client, and interpreting the results of a discovery operation.

After the system has created sub-tables as described, it next creates the definition for a DMID table for use with a reverse look up index (see step 311). This table stores DMIDs for all the values in all the input and output columns in the model. The nature and purpose of such table/index will be detailed below with reference to FIG. 3B. For now, simply recognize that this "reverse" index is used to translate DMIDs used by a data mining engine to corresponding values from the relational database. This table/index is not populated at this point. Space is allocated and the necessary definitions are created.

Next, at a step 313, the system creates definitions for one or more "forward" indexes on model input and output columns. A discussion of such forward indexes will be provided with reference to FIG. 3C. For now, recognize that such forward indexes are used to translate values from the relational database to corresponding DMIDs for use by the data mining engine. This index is not populated at this point. Space is allocated and the necessary definitions are created.

Any given input or output column in a model may have its values represented as ranges of discrete values (which appear in the relational database). A user might specify such ranges in a MAPPING RANGES specification of a CREATE MODEL statement; e.g., mapping ranges (1/1 to 3/31 as 'Q1', 4/1 to 6/31 as 'Q2', 7/1 to 9/30 as 'Q3', 10/1 to 12/31 as 'Q4').

Figure 3B:
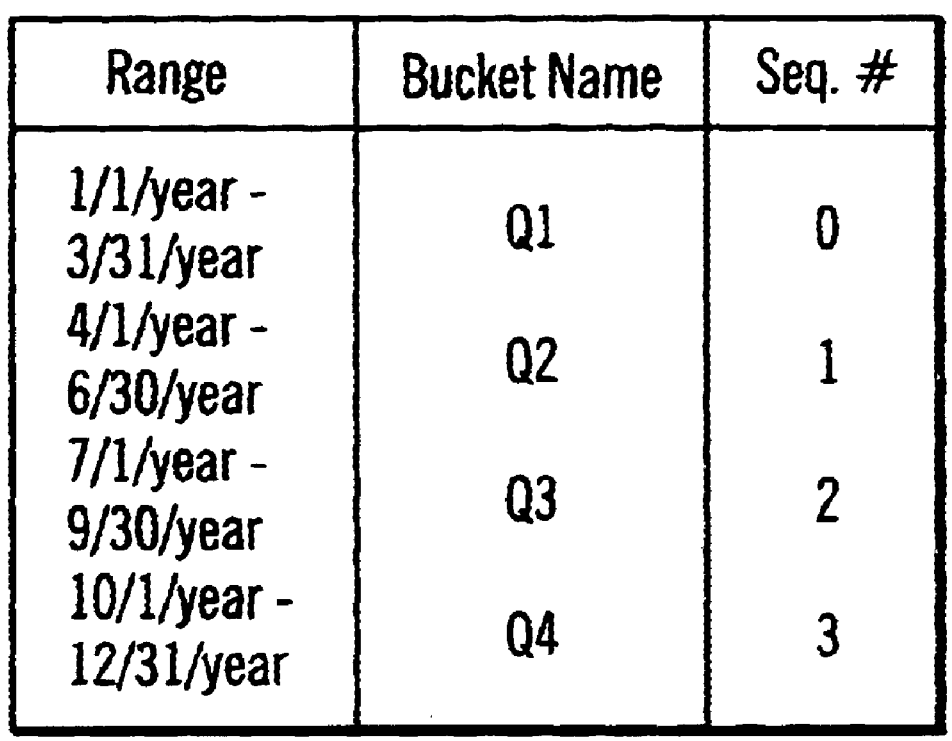
FIG. 3B is a diagram representing a "bucket name table" created by a system of this invention to keep track of ranges of continuous data values used in a data mining model.
Figure 3C:
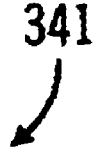
FIG. 3C is a diagram representing a "composite" index for translating a bucket name to a corresponding identifier used by a data mining engine integrated with a relational database management system.
Figure 3D:
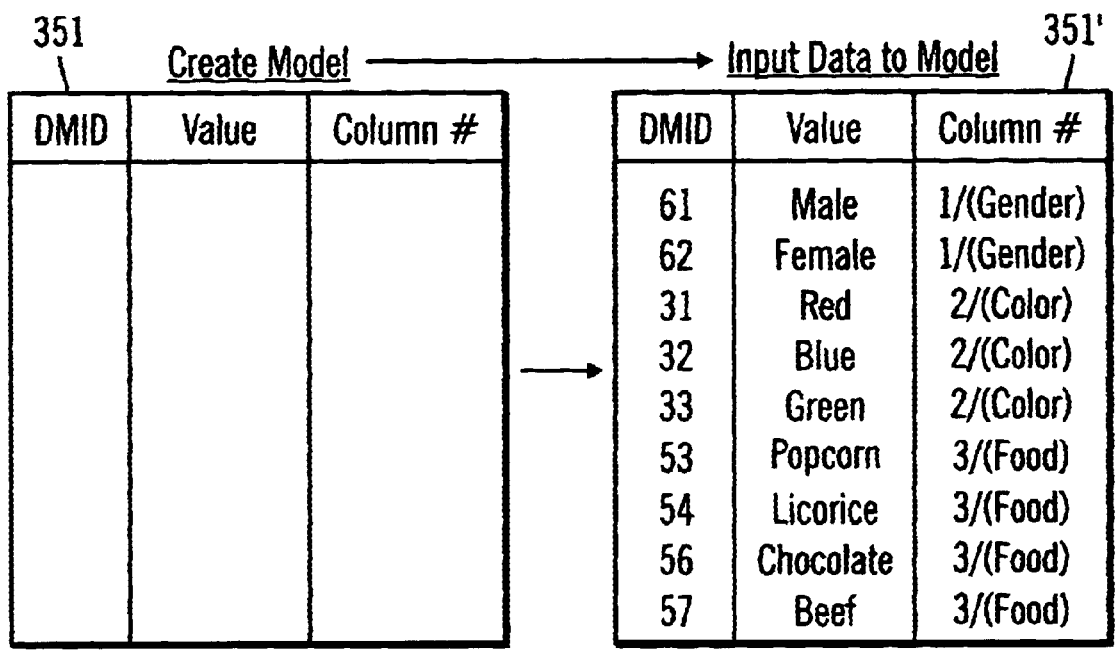
FIG. 3D is a diagram representing a reverse look up index for translating an identifier used by a data mining engine to an attribute used in a relational database.

To keep track of such ranges (buckets) when considering values in the model, the system may create a bucket name table 331 as illustrated in FIG. 3D. This procedure is illustrated at a decision step 315 and a process step 317 in FIG. 3A. At step 315, the system determines whether the CREATE MODEL command specifies buckets of data for an input or output column. If so, the system creates and populates a bucket name table (as exemplified in FIG. 3D) for each input or output column including buckets.

In the example shown in FIG. 3B, the bucket name table includes a bucket name column, a range column, and a sequence number of the range (e.g., 0, 1, 2, or 3 for Q1, Q2, Q3, or Q4). The range column represents a range of discrete data values from the relational database which constitute a given bucket. In the example shown, the bucket names correspond to quarters of a year. Thus, for example, quarter 1 ("Q1") appears in the bucket name column and the corresponding value in the range column are the dates January 1 through March 31. The standard ranges are identified for Q2, Q3, and Q4 as illustrated. Note that a separate bucket name table may be created for each column that employs mapped ranges. Further, there may be a data type conversion associated with the values in a column that has been range mapped. Preferably, such conversions are implicit. The relationship between the range column and the mapped column is stored in the model. Both the pre-mapped column and the post-mapped column definitions are part of the model. In essence, one inserts into the pre-mapped column and selects from the post-mapped column.

After the bucket name table has been created and populated, the system creates and populates (step 319) a composite index on the DMID model table (defined at step 311). For each mapped range in the CREATE MODEL statement, the composite index identifies the column in the model where range is used, the sequence number of the range, and the DMID associated with the range. As shown in FIG. 3C, a composite index 341 may be represented as a table having as a key a combination of the values in two columns: a column number in the model column and a range sequence number column. The composite index includes a third column: a DMID column. In a specific embodiment, a single composite index is created for all columns that include mapped ranges—as exemplified in FIG. 3C.

The composite index is used to get the DMID associated with a mapped to range (sequence number) associated with a given column. Note that the system must obtain the DMID for each mapped range at this point (in order to populate the index). It may accomplish this by requesting the new DMIDs from the data mining engine. Similar operations will be described with reference to the INSERT operation described with reference to FIG. 4.

In this embodiment of the invention, the data mining engine uses DMIDs not only for representing specific data values in tables, but also for representing the columns themselves that house those data values in the model. This is important because it lets the data mining engine know the relationship between the model inputs and the model output.

Thus, after the system has created and populated any appropriate bucket name and composite tables at steps 317 and 319 (or after the system has determined that decision step 315 is answered in the negative), the system registers input and output columns for DMIDs usable by the data mining engine (see step 321). Registration accomplishes two sub-steps: (1) the DBMS receives DMIDs to identify each column and (2) the data mining engine receives notification that there is a relationship (indicated by specifying some columns as input columns and one column as an output column). Regarding the first of these sub-steps, the system must obtain the column DMIDs from the data mining engine as described for step 319. The DMID/column pairs that result are stored in the DMID model created at step 311. Regarding the second of these sub-steps, the system flags the DMIDs associated with output data columns so that the data mining engine understands these DMIDs to be output DMIDs.

Next, at a step 323, the system creates the definitions for the model table itself. This involves specifying all input columns and the output column for the model table itself. This step is analogous to steps 305, 307, and 309 for defining the three sub-tables of the model. Thus, the model table is not yet populated with data. The model table serves as a template to allow insertions, deletions, etc. of input and output data and columns in the model. This is particularly beneficial during model refinement (step 211 of FIG. 2). The model also serves as the object of any data insertions into the model.

Finally, at a step 325, the system sets any discrimination and/or occurrence thresholds as necessary; the use of such thresholds is described below. If the user has specified one or more of these thresholds in the CREATE MODEL command, those thresholds are employed in the model definition. Otherwise, the system simply uses the default threshold values. After setting any necessary threshold values, the model definition is complete and the CREATE MODEL command has been fully executed.

As noted at step 311, the system creates definitions for a reverse look up index. Such reverse look up index is illustrated in FIG. 3D. The left side of this diagram shows a definition 351 for the index as it might appear (logically) at the model creation phase of data mining. The index definition includes a DMID and an associated value from the relational database. Thus, index definition 351 includes a DMID column and a value column. The column number of model table 27 is stored in the index (as a third column) where a row ID is ordinarily stored (i.e., in an index on an ordinary table). The DMID portion of this key forms the leading component of the index to allow easy conversion of a DMID provided from the data mining engine to the associated relational database attribute value.

Because the data from the relational database that will be used to populate the model has not yet been identified to the system, the reverse look up index is unpopulated at this stage. Later, at the model population phase, the DMIDs for discrete data values from the relational database are specified as illustrated at the right side of the FIG. 3D (see index 351').

Figure 3E:
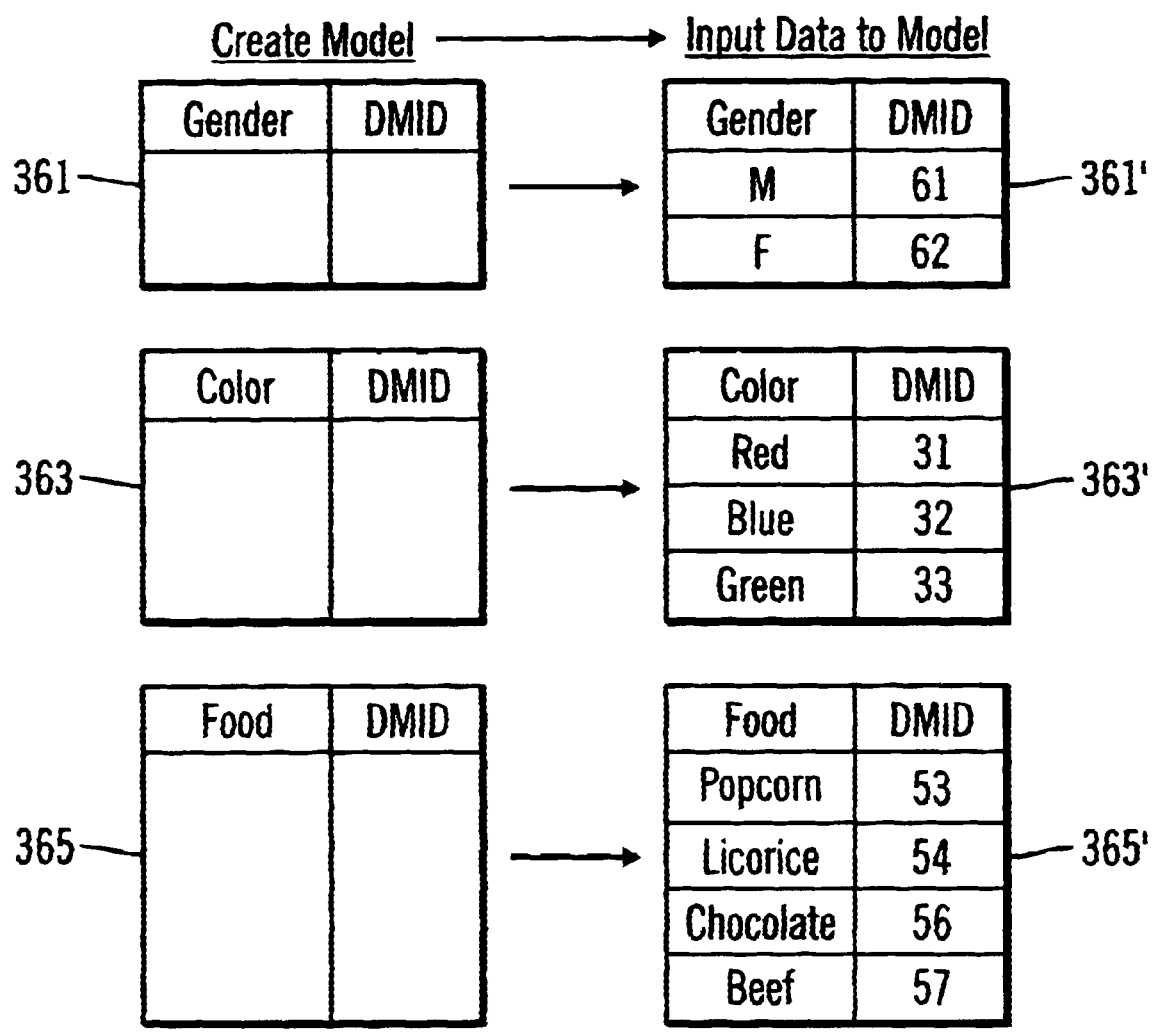
FIG. 3E is a diagram representing forward look up indexes for translating an attribute used in a relational database to an identifier used by a data mining engine to integrated with a relational database management system.

As indicated at step 313 of FIG. 3A, the system also defines a forward index for each input and output column of the model. Again, because the model has not yet been populated with discrete values, this step merely defines the indexes and does not populate them. That is, it does not assign DMIDs for specific database values. This is illustrated in FIG. 3E where at the CREATE MODEL phase (left side of the figure), three separate forward indexes (361, 363, and 365) are defined, one for each attribute in the model. For the sake of simplicity, this model has as input columns "gender" and "color." It has as an output column "food." In these forward indexes, the key is the column value from the relational database.

Two distinctions from the reverse look up index (351) are worth noting. First, the leading component of the key is the relational database attribute, not the DMID. This is because the purpose of the forward index is to translate relational database values to DMIDs that can be provided to the data mining engine. Thus, the forward indexes are used to translate data from the relational database to the data mining engine. In contrast, the reverse index is used to translate data from the data mining engine to the relational database format. Second, a separate forward index is created for each attribute in the model. In is contrast, only a single reverse index is created, which includes all attributes in the model. This is because the system does not know which column a DMID is associated with until it looks it up in the index. Note that the forward indexes may be combined into a single index. In a preferred embodiment, the indexes described herein are implemented as B-Tree indexes.

Figure 4:
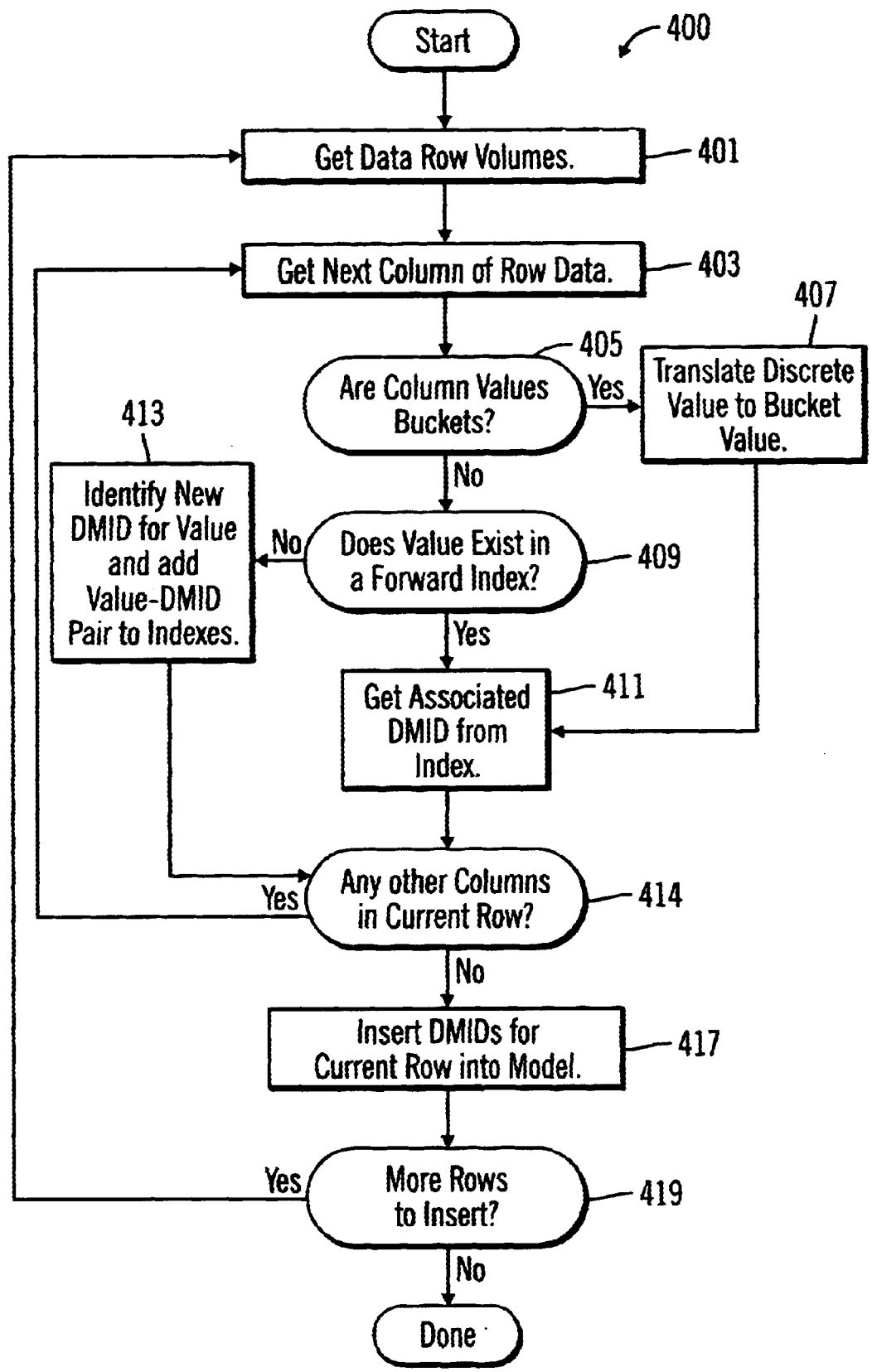
FIG. 4 is a process flow diagram illustrating a procedure for inserting data into a model with data from a relational database.

The population phase (sometimes referred to as the INSERT phase) of the invention is depicted in FIG. 4 as a process 400. A model may be populated and the data mining discovery process is triggered when an INSERT statement that selects rows from existing database tables is issued. In this case, assume that a predefined table or view exists in the database that contains the three columns used in the model:

| CANDY | DRINKS | POPCORN |
|---|---|---|
| Chocolate | Lemonade | No |
| NULL | Soda | Yes |
| Chocolate | Soda | Yes |
| Licorice | NULL | No |
| Chocolate | Soda | Yes |

Each row reflects a sales transaction at a movie theater. The INSERT statement would look like this:

insert into popcorn_model
select * from popcorn_view;

Logically, this statement selects all the rows and columns from the view and inserts them into the model. Although this is the simplest possible query, in most cases the INSERT statement will contain a much more complex query that to "transforms" the warehouse data into a result set that matches a larger set of column definitions in the model. For example, the query might join several tables and perform calculations on certain columns.

When the INSERT statement is issued (via any SQL interface connected to the database), the data mining discovery process may take place automatically, and the UNDERSTAND and PREDICT sub-tables may be queried based on the newly inserted relationships without further user intervention. These sub-tables are the source of the knowledge discovered by the data mining exercise.

Initially in process 400, the system gets the first row of the data at a step 401. This row will include multiple input columns and an output column. After the first row has been selected and made the " current row," the system gets the first column of that row at a step 403. This column of the first row is then made the "current column." During process 400, the system incrementally considers each row and each column of such row in a nested fashion. Thus, process 400 repeatedly loops back through steps 401 and 403 as detailed below.

After the current row and column have been selected (to define an intersection of a row and a column), the system determines, at a decision step 405, whether the value at that intersection is in a bucket. If so, the system translates the discrete value from the relational database (and associated with that column-row intersection) to a bucket value (see step 407 which may employ a bucket name table as in FIG. 3B). Assuming, on the other hand, that the system determines that the value at the current row-column intersection is not to be converted to a bucket value, the system next determines whether the associated relational database value exists in a forward index (such as the indexes depicted in FIG. 3E). See step 409. If so, this means that the value had been previously considered in population process 400 and added to the forward index. In such case (decision step 409 is answered in the affirmative), the system gets the associated DMID from the forward index at a step 411. Note that if the current value was part of a bucket (decision step 405 was answered in the affirmative) process control is directed from step 407 to step 411. In other words, the DMID for the associated bucket value is retrieved from the appropriate forward index.

Assuming that decision step 409 is answered in negative (the current value does not exist in a forward index), the system identifies a new DMID for that value and then adds the new value-DMID pair to the appropriate forward index and to the reverse index. See step 413. Note that to identify a new DMID for the value, the system may consult the data mining engine.

After the new DMID has been obtained and the index is updated, the system next determines whether there are any other columns in the current row at a decision step 414. Assuming that there are other columns in the current row, process control returns to step 403 where the system gets the next column in the model. Process control then follows the above defined flow beginning at decision step 405. The system continues to loop through the flow bracketed by steps 403 and 414 until each column of the current row has been considered. Step 414 may also be performed immediately after step 411 (which assumes that decision step 409 had been answered in the affirmative).

After all columns for the current row have been considered (step 414 answered in the negative), the system provides the row associated DMIDs for the current row to the data mining engine. The data mining engine may then insert them into its internal model data object 39 (FIG. 1B) at a step 417.

Next, the system determines whether there are any other rows remaining in the data to be inserted at a decision step 419. Assuming that such additional rows do exist, process control returns to step 401 when the system retrieves the next row of the data for consideration as described above. The flow bracketed by steps 401 and 419 defines the outer loop of the nested column-row process 400. Eventually, all rows of the data to be inserted into the model will be considered. At that point, decision step 419 is answered in the negative and the process is concluded.

Figure 5A:
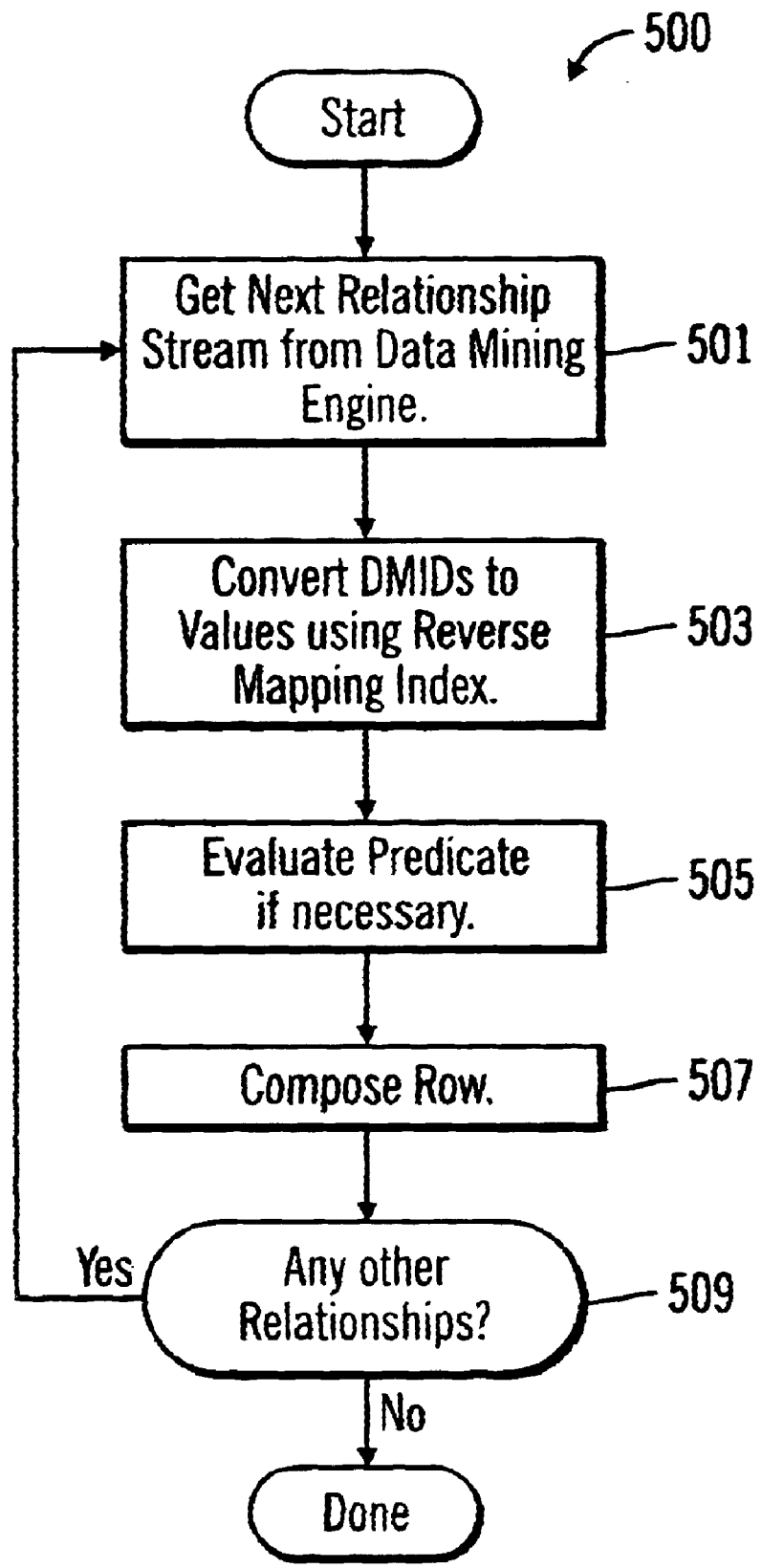
FIG. 5A is a process flow diagram illustrating a procedure for selecting information from an "UNDERSTAND" table generated with the aid of a data mining engine.

A process for selecting information from an UNDERSTAND sub-table is depicted in FIG. 5A as a process flow 500. The results of the discovery process may be selected from the UNDERSTAND sub-table, using any SELECT statement. The contents of this sub-table may be quite detailed, but the essential information may be embodied in a few specific columns. In a specific example, the most useful discovery ratings are the "Importance" values; these specify, numerically, the strength of the relationship (or correlation) between a given input value or set of input values and a given output value. A set of input values that, taken together, are significant is known as a conjunction; each conjunction is given an ID number.

One way to constrain on the UNDERSTAND sub-table is to select all the columns but use the RANK function in the WHEN clause to return only those rows with the highest Importance ratings. This significant advantage is a direct result of the integration of the data mining engine and the relational database management system. It allows the understand table to be queried in a manner that returns only those relationships that are most pertinent to the user for data mining purposes. An example using the RANK function follows:

select * from popcorn_understand when rank (importance)←3;

In standard SQL, this expression may read:

select * from popcorn_understand where importance ←3;

| TYPE | ConjID | Input | Value | Imp | Disc | OccCt | OccFr | POPCORN |
|------|--------|--------|-----------|--------|--------|-------|-------|---------|
| N | 1 | CANDY | Chocolate | 178.08 | 65.17 | 10 | 35.71 | No |
| N | 1 | DRINKS | Lemonade | 178.08 | 65.17 | 10 | 35.71 | No |
| N | NULL | DRINKS | NULL | 100.00 | 100.00 | 11 | 39.29 | No |
| N | NULL | CANDY | NULL | 100.00 | 100.00 | 45 | 49.45 | Yes |
| N | NULL | CANDY | Licorice | 100.00 | 100.00 | 5 | 17.86 | No |

The strongest correlation in this model in terms of Importance value alone is a conjunction of Chocolate and Lemonade; when products in these two categories are purchased in a single transaction, popcorn tends not to be purchased. Note, however, that the Occurrence_Count (OccCt) value is low; only 10 transactions were recorded in which this correlation was found. Taking all columns into account, the strongest correlation in this result set is represented by the fourth row, which suggests that when no candy is purchased (NULL in the Value column), popcorn is purchased (Yes). This row has the highest possible Importance value for a single input not involved in a conjunction (100), as well as relatively high Discrimination and Occurrence values. The third and fifth rows are also potentially interesting correlations, but like the conjunction of the first two rows, they have very low occurrence counts.

The query process begins with the system receiving a query (in standard SQL, for example) on the UNDERSTAND sub-table. The system then calls an appropriate API of the data mining engine to receive the engine's representation of the complete understand table. The UNDERSTAND sub-table is provided as a relationship stream. This stream may be represented as illustrated in FIG. 5B. As shown there, the stream is provided as pairs of DMIDs for each relationship in the model followed by information about the relationship as determined by the data mining engine. Specifically, such relationship stream may include a stream of pairs <$DMID_{IN}$, $DMID_{OUT}$>, where $DMID_{IN}$ represents a particular value for a particular input column and $DMID_{OUT}$ represents a particular value for the output column. Each pair represents a relationship. In the example above, $DMID_{IN}$ could be CANDY:chocolate and $DMID_{OUT}$ is POPCORN:NO. Associated with the relationship pair is auxiliary information presenting the data mining engine's conclusions regarding the relationship. In a preferred embodiment, this auxiliary information includes such relationship information (indicated above) as conjunctions between input values (if appropriate), the importance (correlation), occurrence count, and occurrence frequency.

As illustrated in FIG. 5A, the system receives the first relationship (of the UNDERSTAND sub-table) from the data mining engine at a step 501. After receiving the relationship stream, the system converts the DMIDs for each pair to relational database values (or buckets as necessary) using the reverse mapping index. See step 503. It first converts the input criteria DMID to the corresponding value and column name/number using the reverse mapping index. It then converts the output DMID to the corresponding value and column name/number. Thus, step 503 converts the DMID information format used by the data mining engine to a user-friendly format that can be interpreted by the user.

Next, at a step 505, the system evaluates any predicates in the SELECT statement. Such predicates may take the form of WHERE statements which delimit the data from the UNDERSTAND sub-table that is presented to the user.

Next, at a step 507, the system composes the row based upon any predicate, the converted DMIDs (step 503) and the associated relationship conclusions drawn by the data mining engine (e.g., correlation, occurrence count, and occurrence frequency). This step essentially presents the values and associated relationship information to the user in a readable format by using various operators available in the relational database management system. In a preferred embodiment, the DBMS employs an operator dedicated to handling queries of the UNDERSTAND sub-table in the manner described above. Generally, an "operator" is a set of program instructions that performs a specific relational algebra operation such as join or union. When evaluating a query, a DBMS may call a sequence of operators to execute the various relational operations that comprise the query.

After the row has been composed as step 507, the system determines whether there are any additional relationships provided by the data mining engine for the current UNDERSTAND sub-table. See step 509. Assuming such additional relationships exist (i.e., there are additional rows in the UNDERSTAND sub-table), process control returns to step 501. Thereafter, the process is executed as described above for the newly current relationship. At some point, all relationships (rows) for the UNDERSTAND sub-table will have been considered. At that point, decision step 509 is answered in the negative and process 500 is concluded.

In a preferred embodiment, the UNDERSTAND sub-table is not a fully populated relational table, but a "virtual table." It contains SQL definitions of a relational table including definitions for columns, locations, sizes, data types, etc. Because it can be queried like a relational table, it appears to be a real fully populated relational table to the user. But because it only returns values when presented with a query and only after converting a relationship stream of DMIDs from the data mining engine, it need not consume much storage space and need not be maintained. Note that the model data (the unique values and buckets) are stored in the "model" and shared among the sub-tables.

As indicated in the discussion of FIG. 2 (step 211), models may require modifications in order to fine tune the discovery results. For example, the data set might not be representative or large enough or additional input and columns might be required. In a preferred embodiment, various SQL-like commands are provided to facilitate modification. For example, a model can be refined by adding or dropping columns with an ALTER MODEL command. If necessary, a user can remove the model and its sub-tables from the database with a DROP MODEL command or delete all the rows from a model with a DELETE command. Also, a CREATE MODEL . . . LIKE command allows a user to make a copy of a model and give it a new name; however, when using this command the rows in the model are not copied, just the column definitions. In this case, it might be interesting to know if the conjunction of Chocolate and Lemonade still amounts to a significant correlation when the model is tested against a larger data set; therefore, another INSERT statement could be issued to add some new rows to the model and automatically update the sub-tables.

In a preferred embodiment, the PREDICT sub-table, like the UNDERSTAND sub-table, can be queried as soon as the model is populated with data. It may be desirable to refine the model to some degree before using it for prediction. Prediction is the process of querying the PREDICT sub-table to discover the most likely output for a given set of input values. A user might query the PREDICT sub-table in two ways:

On a case-by-case (row-by-row) basis with a query that contains WHERE clause constraints on some or all of the input columns.

In "batch" mode by joining from a database table or view to the PREDICT sub-table.

Assuming that the original popcorn model discussed above is not altered or refined in any way, a SELECT statement as follows could be issued to predict the output for a specified pair of inputs:

select * from popcorn_predict where candy='Licorice' and drinks='Soda';

| CANDY | DRINKS | POPC | SCORE | Rank | Valid? | Disc |
|---|---|---|---|---|---|---|
| Licorice | Soda | No | 156 | 1 | Y | 38.00 |
| Licorice | Soda | Yes | 98 | 2 | Y | 0.00 |

It may be desirable to specify WHERE clause conditions on all the input columns. Nonetheless, this kind of query will return more than one row—one for each distinct value in the domain of the output column. In this case, two rows are returned, one for an output value of No and one for Yes. The results of this query may be difficult to judge without a sense of the relative weight of the Score values. Therefore, it is useful to know what the highest score in the entire PREDICT sub-table is; the following query quickly answers this question:

select max(score) from popcorn predict; 200

Given this knowledge, it is reasonable to say that a score of 156 is high; therefore, the prediction that Licorice and Soda purchases do not also involve Popcorn purchases looks reliable. However, note that the opposite case also returns a fairly high score of 98. In conclusion, this model returns some potentially interesting correlations; however, their reliability is difficult to judge until more data has been inserted into the model and the discovery results have been revisited.

A further explanation of some of the fields in the PREDICT table will now be provided. Note that this is but one embodiment. This invention is not limited to these specific fields or the meanings presented here.

The Score value is an integer value that indicates the strength of the prediction. A higher number in this field indicates a stronger prediction. This value is similar to Importance in the UNDERSTAND sub-table.

If a prediction is valid, the "Rank" field indicates its rank relative to all the other valid predictions. If the prediction is not valid, this field has the value 0 (zero). Thus, this Rank field also indicates whether or not the prediction is valid. If it is valid, the value in the Valid field is "Y"; if it is not valid, the value is "N". A valid prediction is one that satisfies the minimal requirements for the predicted output value, as defined in the model's Discrimination Threshold and Occurrence Threshold parameters.

The "Discrimination" field indicates the difference in Score between the best prediction and the nearest other prediction for the given inputs. If this value is small, this might indicate that this output value and the nearest other are similarly likely to occur for the specified input value, or it might indicate that the data mining engine does not have enough information to make a strong distinction between the two predictions. If this value is large, it indicates that the likelihood of the most likely output value occurring is significantly stronger than the next one in rank.

For example, in a Credit model, the three possible output values (using an Account_Status field) are Balanced, Payment_Late, and Overdraft. If, for a given set of inputs, the Discrimination between an output of Balanced and an output of Overdraft is 5, then this might indicate that the inputs used are not very valuable in determining account status (it cannot be accurately predicted that a person with the given characteristics will have a balanced or an overdrawn account); if the Discrimination is 90, then this might indicate that the higher-ranked prediction is useful in predicting the desired outcome (a person with the given characteristics is significantly more likely to have a balanced account than an overdrawn one).

The number of possible relationships returned in a query on the PREDICT sub-table is a function of the cross product of the values in the input columns of the model. Thus, the number of relationships is an exponential function of the number of input columns in the model, and a query can potentially return a very large number of relationships. To limit the return values to the most relevant relationships, users may wish to constrain their queries with predicates.

Assuming that the user does constrain his or her query, it is desirable to pre-process the predicate, to the extent possible, before requesting that the data mining engine return data streams containing relationship data for the PREDICT sub-table. This limits the amount of data returned by the engine for further processing. Otherwise, the system may become bogged down in receiving and processing each and every relationship from the data mining engine associated with the PREDICT sub-table—including many relationships that are irrelevant based upon the query predicate.

Figure 6A:
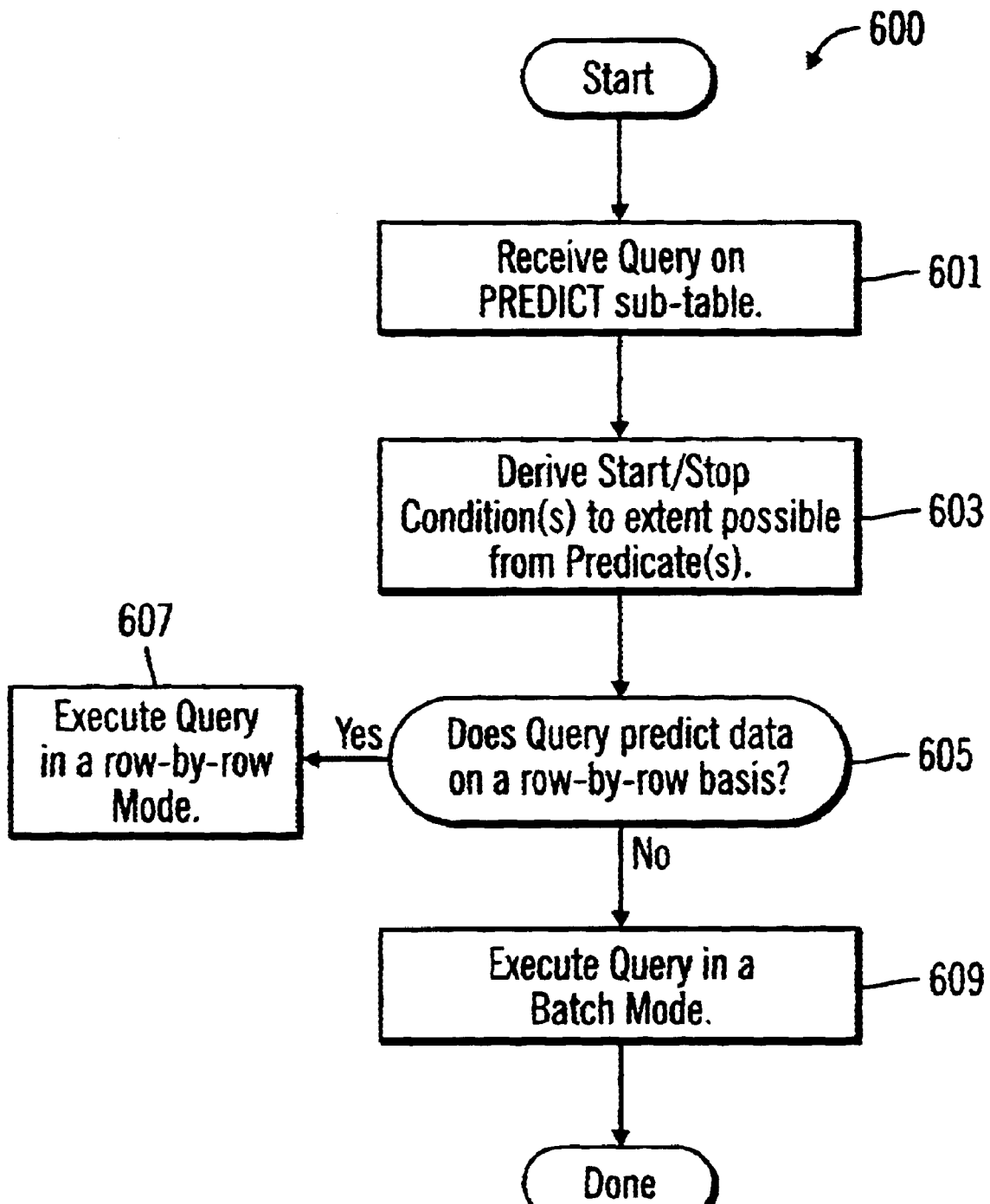
FIG. 6A is a process flow diagram illustrating a procedure for selecting information from a "PREDICT" sub-table generated with the aid of a data mining engine.

In view of the desire to efficiently handle predicates, a process 600 for handling queries on the PREDICT sub-table is presented in FIG. 6A. As shown there, process 600 begins with the system receiving a user query (in standard SQL for example) on the PREDICT sub-table at a step 601. Thereafter, the system derives any "start/stop" conditions to the extent possible from any predicate in the user query. See step 603. Such start/stop conditions are used to constrain the number of relationships returned from the data mining engine by putting the boundaries on the input column values submitted to the data mining engine during processing of the user query. This reduces the number of terms in the cross product.

After any start/stop conditions have been identified in step 603, the system determines whether the user query requests a prediction based on data that is provided in a row-by-row format (see step 605). Assuming that the answer to this question is yes, the system executes the query in a row-by-row mode as indicated at the step 607. The process is then complete. Alternatively, the user query may specify that the predictions be made in a batch mode. If so, the system executes such query in the batch mode as indicated in step 609. The process is then complete following this path.

As indicated above, a batch mode prediction involves a query that requires joining from another data base table or view containing data for which a prediction is desired to the PREDICT sub-table. In contrast, the row-by-row query approach presents the data for which a prediction is desired in a row-by-row basis (without using a table join).

Figure 6B:
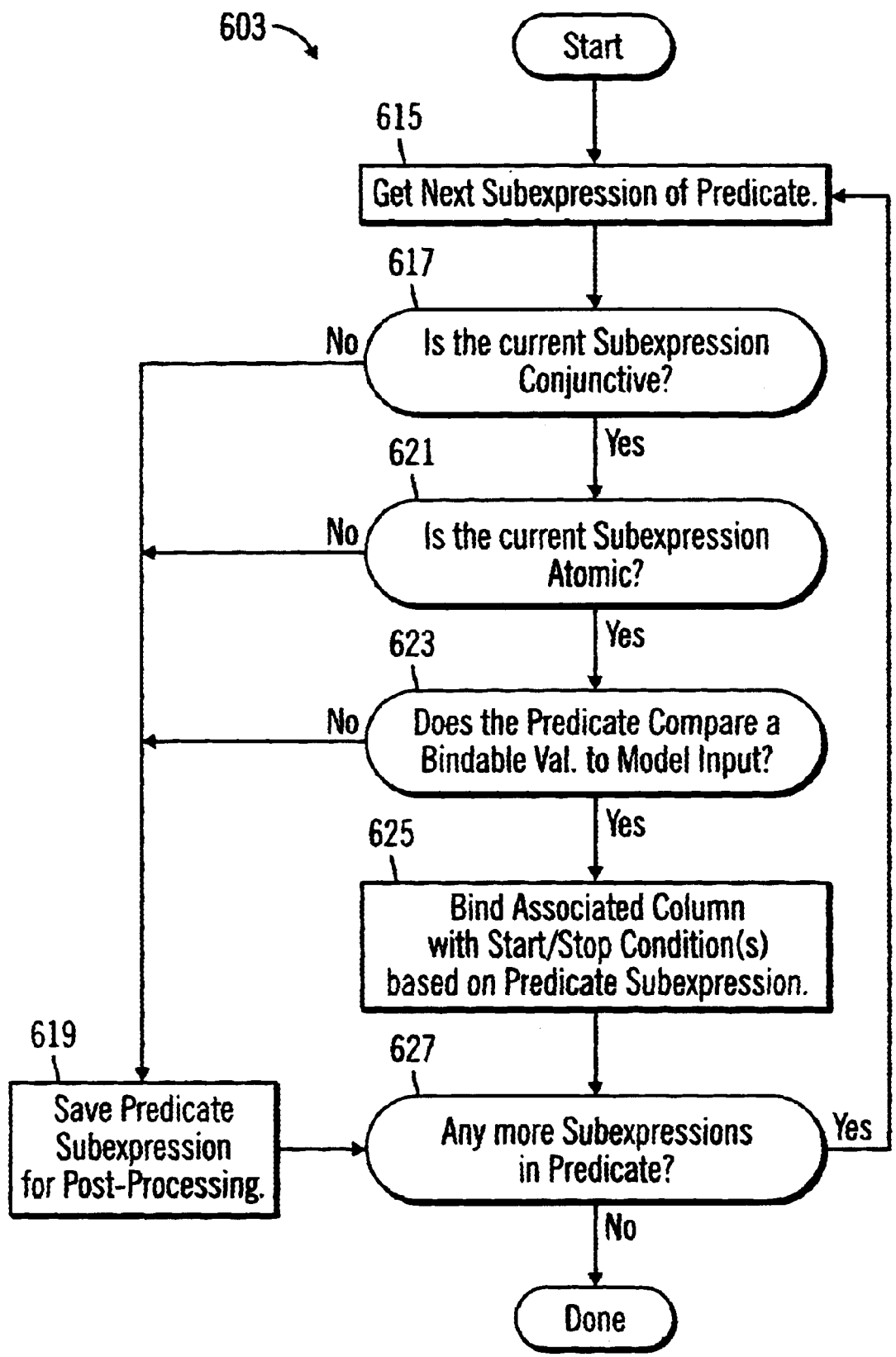
FIG. 6B is a process flow diagram illustrating a procedure for pre-processing a predicate of a query on a PREDICT sub-table in order to define start/stop conditions for the input columns submitted to a data mining engine.

A suitable process for approximating the start/stop conditions (step 603) is detailed in FIG. 6B. As shown there, process 603 begins with the system considering a particular sub-expression of the predicate associated with the PREDICT sub-table query. Note that a predicate may include multiple sub-expressions. See step 615. For example, the following WHERE clause has three sub-expressions:

where candy='licorice'
and drinks ='soda'
and popcorn ='y'

Here "candy='licorice'", "drinks='soda'" and "popcorn='y'" are all sub-expressions.

After the current sub-expression has been identified, the system next determines whether it is conjunctive. See step 617. A disjunctive sub-expression is one connected by a disjunctive logical operator such as an OR. For example, in the predicate "where A=1 or A=2", this sub-expression qualifies as a "disjunctive sub-expression" for purposes of this analysis. If a system determines that the current sub-expression is disjunctive, it saves that sub-expression for post processing at a step 619. In other words, this sub-expression will be applied after the system receives the data streams from the data mining engine.

Assuming that the current sub-expression is conjunctive, the system next determines whether it is "atomic" at a step 621. An atomic predicate sub-expression is one that contains an expression on each side of a comparison operator; e.g., A=1, A=B, A>3, A<9, A<AVG (age), etc. For example, the sub-expressions "where age=15" and "where age>AVG (age) " are atomic sub-expressions when the query is on the age column. On the other hand, the sub-expression "A=B and A<>3" is an example of a non-atomic predicate sub-expression because it contains a logical "and". Assuming that the system determines that the current sub-expression is not atomic (step 621 is answered in the negative), it saves the predicate sub-expression for post processing at step 619 as discussed above.

If, on the other hand, the current sub-expression is in fact atomic, the system next determines whether the predicate sub-expression compares a model input column to a "bindable value." See step 623. A bindable value is any value that can be substituted for an expression at either compile time (such as a literal value such 15 in the expression where age=15) or execute time (such as a correlation value when A=B, where A and B are columns of a join specification). Anything other than an actual exact value is not a bindable value. For example, average age is not a bindable value, because it cannot be evaluated until all values in the column have been considered and averaged. This is true of all expressions using "aggregate" functions on the column being considered.

If the current predicate sub-expression does not employ a bindable value, the predicate sub-expression is saved for post processing at step 619 as explained above. On the other hand, if the predicate compares a bindable value (and is atomic and not disjunctive), then the system brackets the associated column with a start/stop condition based upon the predicate sub-expression (see step 625). In other words, the predicate is evaluated via pre-processing. This limits the number of column values that are submitted to the data mining engine.

After the appropriate start/stop conditions have been applied to the predicate based upon the current sub-expression, the system next determines whether there are any additional sub-expression contained within the predicate. See step 627. If so, process control returns to step 615 where the next sub-expression in the predicate is retrieved. Ultimately, all sub-expressions in the predicate will have been considered via the above-described process flow. When this occurs, decision step 627 is answered in the negative and process 603 is completed.

Figure 6C:
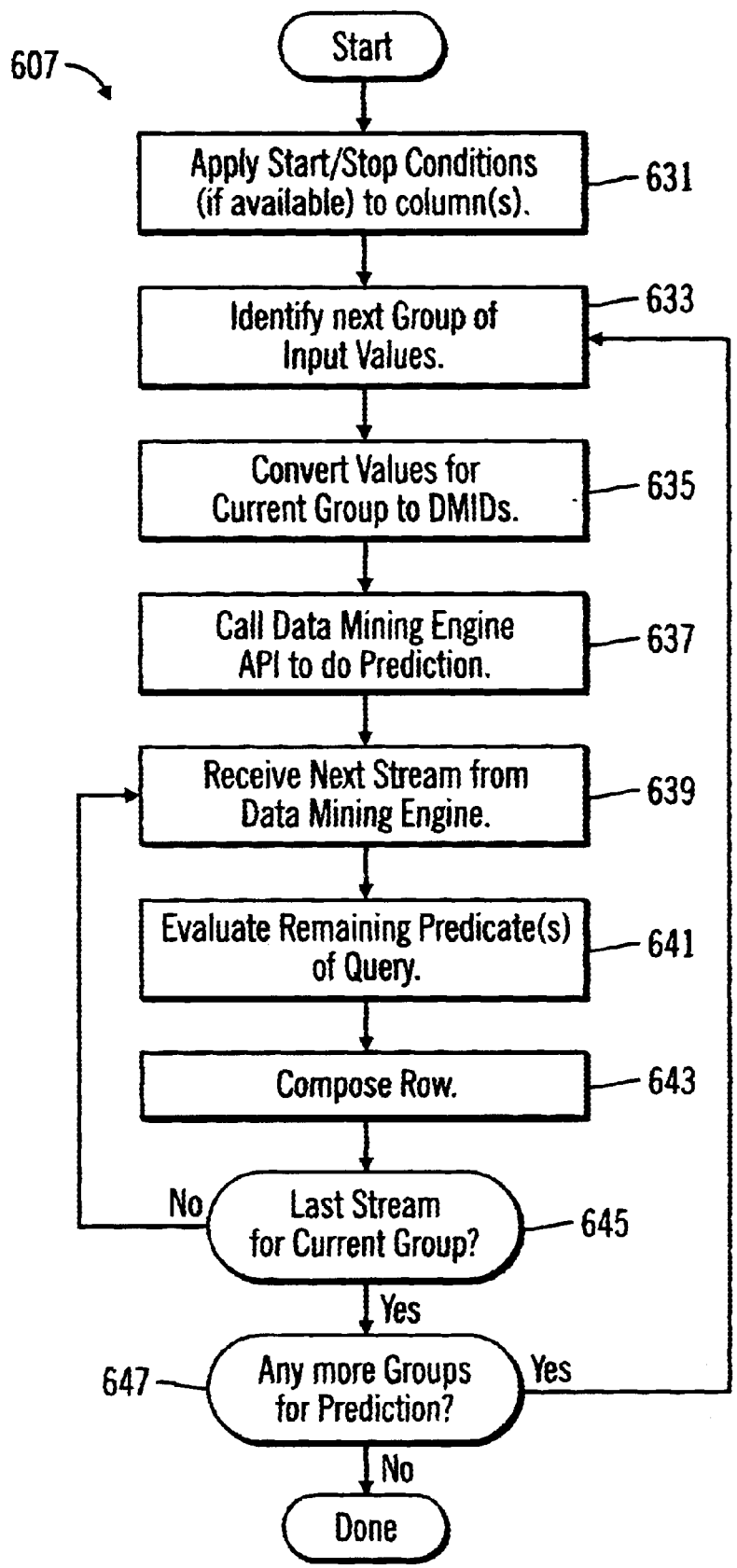
FIG. 6C is a process flow diagram illustrating a procedure for composing rows of data in response to a query on a PREDICT sub-table.

A process for executing a query in a row-by-row mode (step 607) is illustrated in FIG. 6C. As illustrated there, the process begins with the system applying any start/stop conditions that have been previously identified for pre-processing at a step 631. Obviously, the appropriate start/stop conditions are matched to the appropriate input column values being provided to the data mining model.

After all pre-processing predicates have been applied to the appropriate columns, the system feeds the relationships identified for prediction to the data mining engine. These relationships are identified by the cross product of the various input column values. Thus, every possible combination of values from the chosen input columns is submitted to the data mining engine. The various cross product terms may be generated from all possible combinations of values from each of the columns using nested loops, the number of which equals the number of input columns.

The individual terms of the cross product will have a number of values equal to the number of input columns used in the prediction. For example, the input columns in the query might be color (red, green, or blue), gender (male or female), and season (winter, summer, fall, and spring). The cross product of these input columns is <red, male, winter>, <red, male, summer>, <red, male, fall>, <red, male, spring>, <red, female, winter>, <red, female, summer>, <red, female, fall>, <red, female, spring>, <green, male, winter>, <green, male, summer>, <green, male, fall>, <green, male, spring>, <green, female, winter>, <green, female, summer>, <green, female, fall>, <green, female, spring>, <blue, male, winter>, <blue, male, summer>, <blue, male, fall>, <blue, male, spring>, <blue, female, winter>, <blue, female, summer>, <blue, female, fall>, and <blue, female, spring>. Assume that the WHERE clause predicate, and hence the start/stop conditions limited color to blue and gender to male, then cross product terms would be reduced to <blue, male, winter>, <blue, male, summer>, <blue, male, fall>, and <blue, male, spring>. Preferably, the entire cross product is not materialized; rather, it is computed incrementally.

At a step 633, the system identifies the next group of input values in the cross product. It then converts those values to the associated DMIDs at a step 635. If the current value in the cross product term is a value that is mapped to a range, the system must first identify the bucket name associated with the value. It may accomplish this by consulting a bucket name table such as that depicted in FIG. 3B. The DMID for the bucket name may then be obtained from a composite index such as that depicted in FIG. 3C. If, on the other hand, the value under consideration is not part of a mapped range, then the system can simply obtain the appropriate DMID from a forward look-up index such as one of those presented in FIG. 3E.

Next, at a step 637, the system calls the appropriate data mining API to generate a prediction for the current relationship (as defined by the collection of input terms from the cross product). The data mining engine in turn returns a series of predictions, one for each possible output value associated with the input values. The outputs provided by the data mining engine may appear as streams, each including the DMID for the associated output value as well as a data structure presenting the appropriate PREDICT sub-table information about that prediction (e.g., a discrimination value).

Thus, after the data mining API has been called at step 637, the system receives the next stream of data associated with the current group from the data mining engine at a step 639. Again, each stream is associated with a separate output value. The system converts the output DMID to a corresponding database value using a reverse look up table, for example. After the database management system has the converted stream and the associated input values in hand, it evaluates any remaining predicates of the query (i.e., the post-processing predicates of expressions). See step 641. The post-processing of predicates may includes such operations as comparisons of input values versus aggregate values, disjunctive conditions, predicates applied to the value calculated by the data mining engine (e.g., discrimination), etc.

After any remaining predicates have been evaluated, the system composes a row from the current stream at a step 643. This may involve any necessary predicate post processing, the relationship's input and output values, and the associated relationship conclusions drawn by the data mining engine (e.g., discrimination). This step essentially presents the values and associated relationship information to the user in a readable format by using various operators available in the relational database management system. In a preferred embodiment, the DBMS employs an operator dedicated to handling row-by-row queries of the PREDICT sub-table in the manner described above.

Next, at a step 645, the system determines whether the current stream provides the last output value associated with the current set of input values. If not, process control is directed back to step 639 where the system receives the next stream for the current group from the data mining engine. That stream is then processed as described above to compose an associated row. The number of output values associated with a given input groups is the number of possible output values. Ultimately, the last stream for the current group is evaluated (i.e., decision step 645 is answered in the affirmative). At that point, the system determines whether there are any more input groups left for prediction at a step 647. This involves determining whether the last term from the cross product has been considered. Assuming that there are additional groups for prediction, process control is directed back to step 633 where the system identifies the next term "group of input values" in the cross product. Those input values are then processed as described above. Ultimately, the last term of the cross product is considered (step 647 is answered in the negative) and the process is concluded. At that point, the user is presented with the rows of prediction data that he or she requested.

As indicated in FIG. 6A (step 609), a query on the PREDICT sub-table may be executed in batch mode. This approach is generally similar to the row-by-row approach (step 607), except that it involves a join operation between the PREDICT sub-table and some other user specified table containing the input data for which predictions are desired. This ability results because the PREDICT sub-table is has properties of a relational database table. The join operation in a batch mode procedure involves comparing data values from one column of the user specified table with data values from the PREDICT sub-table. This step must be performed in order to define the sets of input values that are fed to the data mining engine for prediction. So, rather than generating the cross product as in the case of the row-by-row procedure, the batch mode operation does the join to define which input values will be used for the prediction. Each row of the table being joined to the PREDICT sub-table is used much as the set of values specified as a predicate the row-by-row process. Preferably, different operators are employed within the RDBMS to perform the row-by-row and batch queries on a PREDICT sub-table.

In a preferred embodiment, the PREDICT sub-table is not a fully populated relational table, but a "virtual table." It contains SQL definitions of a relational table including definitions for columns, locations, sizes, data types, etc. Because it can be queries like a relational table, it appears to be a real fully populated relational table to the user. But because it only returns values when presented with a query and only after converting a stream of DMIDs from the data mining engine, it need not consume much storage space and need not be maintained. Again, the data stored in the model is shared by all sub-tables, including the PREDICT sub-table.

In some cases, a data mining engine and a SQL server will treat a null value differently. In SQL, a null value is unknown and, in most cases, will return no answers. In contrast, certain data mining engines such as the DataCruncher from DataMind will return all possible answers in response a null value. For example, if there is no DMID for Age equals 25 in the look tables and a query includes a predicate WHERE AGE EQUALS 25 (i.e., the age value is null), a SQL query will return no values, while a data mining engine will return all possible values from the age column because the value is unknown. In a preferred embodiment of this invention, the system can be set, at the user's preference, to treat a null value in either the SQL or data mining manner.

As mentioned above, a CREATE MODEL STATEMENT may include an occurrence threshold and/or a discrimination threshold. The occurrence threshold defines the percentage in which a given correlation or conjunction of correlations is required before the relation is retrieved in the UNDERSTAND sub-table. Only those relations with an Occurrence Frequency score in the UNDERSTAND sub-table that is higher than the Occurrence Threshold will be retrieved. For example, selecting from the UNDERSTAND sub-table with the occurrence threshold set to 0 will return all associations, no matter how small, while the same SELECT operation with the occurrence threshold set to 5 would result in the retrieval of only those associations that have a number greater than 5.0 in the Occurrence Freq column of the UNDERSTAND sub-table (in other words, those associations that occur more than 5% of the time). In a specific embodiment, if the user does not specify an occurrence threshold value, a default value of 3.0 (3%) is used.

The Discrimination Threshold is similar to the Occurrence Threshold, except that it applies during prediction instead of during understanding. The Discrimination Threshold affects the number of rows that are generated for a prediction on an input row. If the Discrimination Threshold is set to 0.0, a prediction is generated for each possible output value. The Discrimination, or the difference in strength between the best prediction and the second best prediction, appears in the PREDICT sub-table. In one embodiment, for all prediction values other than the best prediction, the Discrimination value is NULL.

If the Discrimination Threshold is set to a value greater than 0.0, then only the best prediction appears in the PREDICT sub-table. However, if the Discrimination value for the best prediction is equal to or less than the Discrimination Threshold value, no prediction appears. In a specific embodiment, if the user does not specify a Discrimination Threshold value, the default of 0.0 (0%) is used.

Although the foregoing invention has been described in some detail for purposes of clarity of understanding, it will be apparent that certain changes and modifications may be practiced within the scope of the appended claims. For example, the PREDICT and UNDERSTAND sub-tables described above may be partially or fully populated with values. Additionally, some of the above-described specific columns in the sub-tables are not necessary to the invention. Moreover, the discrimination and/or occurrence thresholds are not required. Further, the processes described above may be applied to a single machine as well as a network.

What is claimed is:

1. A computer program product, implemented on a machine readable medium, comprising instructions operable to:
   integrate a relational database with a data mining engine; and
   define a data mining model as a relational table, the data mining model providing multiple relationships between inputs and outputs and indicia of the importance of each relationship between an output and one or more inputs.

2. The computer program product of claim 1, further comprising instructions operable to construct rows corresponding to the relationships in the data mining model in response to user queries.

3. The computer program product of claim 1, further comprising instructions to define one or more columns from a relational database as the inputs to the data mining model relational table.

4. The computer program product of claim 3, further comprising instructions to integrate the data mining model relational table with the relational database on a server.

5. The computer program product of claim 1, further comprising instructions to define a column from a relational database as the output of the data mining model relational table.

6. The computer program product of claim 5, further comprising instructions to integrate the data mining model relational table with the relational database on a server.

7. The computer program product of claim 1, further comprising instructions to indicate the importance of the relationships between the inputs and the output of the data mining model in one or more columns of the data mining model relational table.

8. The computer program product of claim 7, further comprising instructions to indicate occurrence counts for the relationships between the inputs and the output of the data mining model in a column of the data mining model relational table.

9. The computer program product of claim 7, further comprising instructions to to indicate occurrence frequencies for the relationships between the inputs and the output of the data mining model in a column of the data mining model relational table.

10. The computer program product of claim 7, further comprising instructions to indicate correlations for the relationships between the inputs and the output of the data mining model in a column of the data mining model relational table.

11. The computer program product of claim 1, further comprising instructions to define a data mining model relational table having multiple rows, each row providing a relationship between input data values and an output data value, and each row also providing correlations between the output data value and the input data values.

12. The computer program product of claim 11, further comprising instructions to obtain the input data values and the output data value in a row of the data mining model from a relational database, and to calculate correlations between the input data values and the output data value with a data mining engine.

13. The computer program product of claim 1, further comprising instructions to define a look up table to translate between data mining identifiers used by the data mining engine and input and output values used by the data mining model relational table.

14. The computer program product of claim 13, further comprising instructions to define one or more look-up table indexes, including a forward translation index configured to translate data values from data stored in the relational database to data mining identifiers.

15. The computer program product of claim 13, further comprising instructions to define one or more look-up table indexes, including a reverse translation index configured to translate data mining identifiers to corresponding data values of data stored in the relational database.

16. The computer computer program product of claim 1, further comprising instructions to convert between data values of data stored in a relational database managed by the relational database management system and data mining identifiers representing the data values that are used by the data mining engine.

17. The computer program product of claim 1, wherein the instruction to define a data mining model further includes instructions to define one or more data mining sub-tables.

18. The computer program product of claim 1, wherein the data mining capabilities perform calculations without transferring large blocks of data from a remote database.

19. The computer program product of claim 1, wherein the instruction to define a data mining model relational table further comprises instructions to define a relational predict table, the relational predict table providing multiple relationships between inputs and an output and configured to return a predicted output in response to a query containing one or more inputs.

20. The computer program product of claim 19, wherein the instruction to define a relational predict table, further comprises instructions to indentify a column of the relational predict table to hold a confidence value for the output returned in response to the query.

21. The computer program product of claim 19, further comprising instructions to construct one or more rows in the relational predict table in response to one or more corresponding user queries.

22. The computer program product of claim 19, further comprising instructions to identify one or more columns of the relational predict table to receive user specified inputs from a relational database.

23. The computer program product of claim 19, further comprising instructions to identify a column of the relational predict table to receive output from a data mining engine.

24. The computer program product of claim 19, further comprising instructions to identify one or more columns of the relational predict table to receive a value indicating the confidence in the relationship between one or more user specified inputs and the output of the data mining engine.

25. The computer program product of claim 24, further comprising instructions to identify one or more columns of the relational predict table to receive values discriminating the relationship between one or more user specified inputs and the output of the data mining engine.

26. The computer program product of claim 19, wherein the instruction to define the relational predict table further comprises instructions to define multiple rows for the relational predict table, each row providing a relationship between input data values and an output data value and each row also providing a discrimination associated with the relationship.

27. The computer program product of claim 26, further comprising instructions to obtain the input data values and the output data value in a row from a relational database, and to calculate the discrimination of the relationship between the input data values and the output data value with a data mining engine.

28. A method of evaluating a query on a predict table in a data mining model, the predict table providing multiple relationships between input values and output values and configured to return a predicted output value in response to a query containing one or more input values, the method comprising:

(a) identifying an expression or sub-expression in a predicate of the query;

(b) identifying a start/stop condition from the expression or sub-expression;

(c) binding the start/stop condition to a column of the predict table; and (d) passing column values constrained by the start/stop condition to data mining engine.

29. The method of claim 28, further comprising:

identifying a second sub-expression in the predicate; and determining that the second sub-expression will be evaluated after receiving results of a data mining operation from the data mining engine.

30. The method of claim 29, wherein the second sub-expression is saved for binding to results of a data mining operation performed by the data mining engine on column values passed to it.

31. The method of claim 30, wherein the determining whether the expression or sub-expression is an atomic conjunctive expression or sub-expression, further comprises determining whether the expression or sub-expression compares a bindable value to a model input.

32. The method of claim 28, further comprising determining whether the expression or sub-expression is an atomic conjunctive expression or sub-expression, prior to identifying the start/stop condition.

33. A computer system comprising:

a relational database management system;

a data mining engine integrated with the relational database management system such that data values from a relational database managed by the relational database management system are directly converted to data mining identifiers used for data mining operations by the data mining engine, wherein said data mining engine determines characteristics of relationships between input data values and an output data value and wherein the input and output data values are obtained from the relational database.

34. The computer system of claim 33, further comprising a data mining model including a model table specifying input columns and an output column for rows of values from the relational database, which rows specify the relationships between the input values and the output value.

35. The computer system of claim 34, wherein the data mining model includes a definition of one or more data mining sub-tables which are not populated with data values; and one or more data model look up indexes specifying translations between values in the relational database and data mining identifiers used by the data mining engine to represent the relational database values.

36. The computer system of claim 35, wherein the one or more data model indexes include a forward translation index configured to translate data values from the relational database to data mining identifiers.

37. The computer system of claim 35, wherein the one or more data model indexes include a reverse translation index configured to translate data mining identifiers to corresponding data values from the relational database.

38. A computer program product, implemented on a machine readable medium, comprising instructions operable to:

receive a create model statement at a relational database with data mining capabilities; and define a data mining model including at least one of a model table, an understand table, a predict table, a binary table, and an index at the relational database with data mining capabilities.

39. The computer program product of claim 38, wherein the instructions are operable to:

receive an insert statement; and in response to receiving the insert statement:
populate the data mining model with data; and
provide information about patterns to at least one of the understand table, predict table, and binary table.

40. The computer program product of claim 38, wherein the instructions are operable to:

receive a query of the understand table; and identify relevant patterns that were uncovered during data mining.

41. The computer program product of claim 38, wherein the instructions are operable to:

receive a query of a predict table; and return a likely output for a given set of input values.

42. The computer program product of claim 38, wherein the computer program product is implemented on a machine readable medium at a server and wherein the instructions are operable to at least one of:

download the data mining model to a client using the binary table; and upload a data mining model defined at the client using the binary table.

* * * * *

UNITED STATES PATENT AND TRADEMARK OFFICE
CERTIFICATE OF CORRECTION

PATENT NO.     : 6,629,095 B1
DATED          : September 30, 2003
INVENTOR(S)    : William M. Wagstaff et al.

It is certified that error appears in the above-identified patent and that said Letters Patent is hereby corrected as shown below:

<u>Column 14,</u>
Line 63, change "<-" to -- <= --.
Line 66, change "<-" to -- <= --.

<u>Column 23, line 4 - Column 26, line 51,</u>
Replace claims 1-42 with the corrected claims shown below:

1. A computer program product, implemented on a machine readable medium, comprising instructions operable to:
at a relational database engine with data mining capabilities, define a data mining model as at least one relational table, the data mining model providing multiple relationships between inputs and outputs and indicia of the importance of each relationship between an output and one or more inputs, wherein the data mining capabilities use data managed by the relational database engine.

2. The computer program product of claim 1, further comprising instructions operable to construct rows corresponding to the relationships in the data mining model in response to user queries.

3. The computer program product of claim 1, further comprising instructions to define one or more columns from a relational database as the inputs to the data mining model relational table.

4. The computer program product of claim 1, further comprising instructions to define a column from a relational database as the output of the data mining model relational table.

5. The computer program product of claim 4, further comprising instructions to integrate the data mining model relational table with the relational database on a server.

6. The computer program product of claim 3, further comprising instructions to integrate the data mining model relational table with the relational database on a server.

7. The computer program product of claim 1, further comprising instructions to indicate the importance of the relationships between the inputs and the output of the data mining model in one or more columns of the data mining model relational table.

8. The computer program product of claim 7, further comprising instructions to indicate occurrence counts for the relationships between the inputs and the output of the data mining model in one or more columns of the data mining model relational table.

9. The computer program product of claim 7, further comprising instructions to indicate occurrence frequencies for the relationships between the inputs and the output of the data mining model in one or more columns of the data mining model relational table.

UNITED STATES PATENT AND TRADEMARK OFFICE
CERTIFICATE OF CORRECTION

PATENT NO. : 6,629,095 B1
DATED : September 30, 2003
INVENTOR(S) : William M. Wagstaff et al.

It is certified that error appears in the above-identified patent and that said Letters Patent is hereby corrected as shown below:

Column 23, line 4 - Column 26, line 51 (cont'd),

10. The computer program product of claim 7, further comprising instructions to indicate correlations for the relationships between the inputs and the output of the data mining model in one or more columns of the data mining model relational table.

11. The computer program product of claim 1, wherein the instruction to define a data mining model relational table further comprises instructions to define a data mining model relational table having multiple rows, each row providing a relationship between input data values and an output data value, and each row also providing correlations between the output data value and the input data values.

12. The computer program product of claim 1, further comprising instructions to obtain the input data values and the output data value in a row of the data mining model from a relational database, and to calculate correlations between the input data values and the output data value with the data mining capabilities.

13. The computer program product of claim 1, further comprising instructions to define a look up table to translate between data mining identifiers used by the data mining capabilities and input and output values used by the data mining model relational table.

14. A computer system comprising:
a relational database management system with data mining capabilities directly converting data values from a relational database managed by the relational database management system to data mining identifiers used for data mining operations by the data mining capabilities, wherein said data mining capabilities determine characteristics of relationships between input data values and an output data value and wherein the input and output data values are obtained from the relational database.

15. The computer system of claim 14, further comprising a data mining model including a model table specifying input columns and an output column for rows of values from the relational database, which rows specify the relationships between the input values and the output value.

16. The computer system of claim 15, wherein the data mining model includes
a definition of one or more data mining sub-tables which are not populated with values; and
one or more data model look up indexes specifying translations between values in the relational database and data mining identifiers used by the data mining capabilities to represent the relational database values.

17. The computer system of claim 16, wherein the one or more data model indexes include a forward translation index configured to translate data values from the relational database to data mining identifiers.

UNITED STATES PATENT AND TRADEMARK OFFICE
CERTIFICATE OF CORRECTION

PATENT NO. : 6,629,095 B1
DATED : September 30, 2003
INVENTOR(S) : William M. Wagstaff et al.

It is certified that error appears in the above-identified patent and that said Letters Patent is hereby corrected as shown below:

Column 23, line 4 - Column 26, line 51 (cont'd),

18. The computer system of claim 16, wherein the one or more data model indexes include a reverse translation index configured to translate data mining identifiers to corresponding data values from the relational database.

19. The computer program product of claim 1, wherein the instruction to define a data mining model as at least one relational table further comprises instructions to define a relational predict table, the relational predict table providing multiple relationships between inputs and an output and configured to return a predicted output in response to a query containing one or more inputs.

20. The computer program product of claim 19, wherein the instruction to define a relational predict table, further comprises instructions to identify a column of the relational predict table to hold a confidence value for the output returned in response to the query.

21. The computer program product of claim 19, further comprising instructions to construct one or more rows in the relational predict table in response to one or more corresponding user queries.

22. The computer program product of claim 19, further comprising instructions to identify one or more columns of the relational predict table to receive user specified inputs from a relational database.

23. The computer program product of claim 19, further comprising instructions to identify a column of the relational predict table to receive output from a the data mining capabilities.

24. The computer program product of claim 19, further comprising instructions to identify one or more columns of the relational predict table to receive a value indicating the confidence in the relationship between one or more user specified inputs and the output of the data mining capabilities.

25. The computer program product of claim 24, further comprising instructions to identify one or more columns of the relational predict table to receive values discriminating the relationship between one or more user specified inputs and the output of the data mining capabilities.

UNITED STATES PATENT AND TRADEMARK OFFICE
CERTIFICATE OF CORRECTION

PATENT NO. : 6,629,095 B1
DATED : September 30, 2003
INVENTOR(S) : William M. Wagstaff et al.

It is certified that error appears in the above-identified patent and that said Letters Patent is hereby corrected as shown below:

<u>Column 23, line 4 - Column 26, line 51 (cont'd),</u>

26. The computer program product of claim 19, wherein the instruction to define the relational predict table further comprises instructions to define multiple rows for the relational predict table, each row providing a relationship between input data values and an output data value and each row also providing a discrimination associated with the relationship.

27. The computer program product of claim 26, further comprising instructions to obtain the input data values and the output data value in a row from a relational database, and to calculate the discrimination of the relationship between the input data values and the output data value with the data mining capabilities.

28. A method of evaluating a query on a predict table in a data mining model, the predict table providing multiple relationships between input values and output values and configured to return a predicted output value in response to a query containing one or more input values, the method comprising:
        (a) identifying an expression or sub-expression in a predicate of the query;
        (b) identifying a start/stop condition from the expression or sub-expression;
        (c) binding the start/stop condition to a column of the predict table; and
        (d) passing column values constrained by the start/stop condition to a data mining engine.

29. The method of claim 28, further comprising:
identifying a second sub-expression in the predicate; and
determining that the second sub-expression will be evaluated after receiving results of a data mining operation from the data mining engine.

30. The method of claim 29, wherein the second sub-expression is saved for binding to results of a data mining operation performed by the data mining engine on column values passed to it.

31. The method of claim 28, further comprising determining whether the expression or sub-expression is an atomic conjunctive expression or sub-expression, prior to identifying the start/stop condition.

32. The method of claim 30, wherein determining whether the expression or sub-expression is an atomic conjunctive expression or sub-expression, further comprises determining whether the expression or sub-expression compares a bindable value to a model input.

33. The computer program product of claim 1, further comprising instructions to convert between data values of data stored in a relational database managed by the relational database management system and data mining identifiers representing the data values that are used by the data mining capabilities.

UNITED STATES PATENT AND TRADEMARK OFFICE
CERTIFICATE OF CORRECTION

PATENT NO. : 6,629,095 B1
DATED : September 30, 2003
INVENTOR(S) : William M. Wagstaff et al.

It is certified that error appears in the above-identified patent and that said Letters Patent is hereby corrected as shown below:

Column 23, line 4 - Column 26, line 51 (cont'd),

34. The computer program product of claim 1, wherein the instruction to define a data mining model further includes instructions to define one or more data mining sub-tables.

35. The computer program product of claim 13, further comprising instructions to define one or more look-up table indexes, including a forward translation index configured to translate data values from data stored in the relational database to data mining identifiers.

36. The computer program product of claim 13, further comprising instructions to define one or more look-up table indexes, including a reverse translation index configured to translate data mining identifiers to corresponding data values of data stored in the relational database.

37. The computer program product of claim 1, wherein the data mining capabilities perform calculations without transferring large blocks of data from a remote database.

38. A computer program product, implemented on a machine readable medium, comprising instructions operable to:
    receive a create model statement at a relational database with data mining capabilities; and
    define a data mining model including at least one of a model table, an understand table, a predict table, a binary table, and an index at the relational database with data mining capabilities.

39. The computer program product of claim 38, wherein the instructions are operable to:
    receive an insert statement; and
    in response to receiving the insert statement:
        populate the data mining model with data; and
        provide information about patterns to at least one of the understand table, predict table, and binary table.

40. The computer program product of claim 38, wherein the instructions are operable to:
    receive a query of the understand table; and
    identify relevant patterns that were uncovered during data mining.

41. The computer program product of claim 38, wherein the instructions are operable to:
    receive a query of a predict table; and
    return a likely output for a given set of input values.

UNITED STATES PATENT AND TRADEMARK OFFICE
CERTIFICATE OF CORRECTION

PATENT NO.     : 6,629,095 B1
DATED          : September 30, 2003
INVENTOR(S)    : William M. Wagstaff et al.

It is certified that error appears in the above-identified patent and that said Letters Patent is hereby corrected as shown below:

<u>Column 23, line 4 - Column 26, line 51 (cont'd),</u>

42.    The computer program product of claim 38, wherein the computer program product is implemented on a machine readable medium at a server and wherein the instructions are operable to at least one of:
        download the data mining model to a client using the binary table; and
        upload a data mining model defined at the client using the binary table.

Signed and Sealed this

Twentieth Day of April, 2004

JON W. DUDAS
*Acting Director of the United States Patent and Trademark Office*